(12) United States Patent
Ichikawa et al.

(10) Patent No.: US 10,775,785 B2
(45) Date of Patent: Sep. 15, 2020

(54) AUTOMATIC DRIVING SYSTEM

(71) Applicant: TOYOTA JIDOSHA KABUSHIKI KAISHA, Toyota-shi, Aichi-ken (JP)

(72) Inventors: Kentaro Ichikawa, Shizuoka-ken (JP); Kunihito Sato, Mishima (JP); Bunyo Okumura, Susono (JP); Maiko Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 221 days.

(21) Appl. No.: 15/948,027

(22) Filed: Apr. 9, 2018

(65) Prior Publication Data
US 2018/0292822 A1  Oct. 11, 2018

(30) Foreign Application Priority Data

Apr. 11, 2017 (JP) .................. 2017-078396

(51) Int. Cl.
| | |
|---|---|
| G05D 1/00 | (2006.01) |
| G06K 9/00 | (2006.01) |
| G05D 1/02 | (2020.01) |
| B60W 30/12 | (2020.01) |
| B60W 40/08 | (2012.01) |
| B60W 50/14 | (2020.01) |

(52) U.S. Cl.
CPC .......... *G05D 1/0061* (2013.01); *B60W 30/12* (2013.01); *B60W 40/08* (2013.01); *B60W 50/14* (2013.01); *G05D 1/0248* (2013.01); *G05D 1/0257* (2013.01); *G05D 1/0274* (2013.01); *G05D 1/0278* (2013.01); *G06K 9/00798* (2013.01); *G06K 9/00805* (2013.01); *G06K 9/00845* (2013.01); *B60W 2040/0818* (2013.01); *B60W 2050/146* (2013.01); *B60W 2420/42* (2013.01); *B60W 2420/52* (2013.01); *G05D 2201/0213* (2013.01)

(58) Field of Classification Search
None
See application file for complete search history.

(56) References Cited

U.S. PATENT DOCUMENTS

| | | |
|---|---|---|
| 2010/0042282 A1 | 2/2010 | Taguchi et al. |
| 2012/0022716 A1 | 1/2012 | Kitahama et al. |

(Continued)

FOREIGN PATENT DOCUMENTS

| | | |
|---|---|---|
| JP | 2008-129804 A | 6/2008 |
| JP | 2010-198578 A | 9/2010 |

(Continued)

*Primary Examiner* — Tuan C To
*Assistant Examiner* — Kelly D Williams
(74) *Attorney, Agent, or Firm* — Sughrue Mion, PLLC

(57) ABSTRACT

An automatic driving system includes an electronic control unit. The electronic control unit is configured: to create a first travel plan of a vehicle based on a position of the vehicle, an environment surrounding the vehicle, and a state of the vehicle; to calculate a first reliability of the first travel plan; to create a second travel plan of the vehicle based on one or two of the position of the vehicle, the environment surrounding the vehicle, and the state of the vehicle; to calculate a second reliability of the second travel plan; and to start the automatic driving control such that the vehicle travels based on the first travel plan when the first reliability of the first travel plan is equal to or higher than the second reliability of the second travel plan.

6 Claims, 8 Drawing Sheets

(56) References Cited

U.S. PATENT DOCUMENTS

| | | |
|---|---|---|
| 2013/0110343 A1 | 5/2013 | Ichikawa et al. |
| 2016/0327947 A1 | 11/2016 | Ishikawa et al. |
| 2017/0261981 A1 | 9/2017 | Ichikawa et al. |
| 2017/0261984 A1 | 9/2017 | Ichikawa et al. |

FOREIGN PATENT DOCUMENTS

| | | |
|---|---|---|
| JP | 2011-162132 A | 8/2011 |
| JP | 2012-051441 A | 3/2012 |
| JP | 5382218 B2 | 10/2013 |
| JP | 2014-106854 A | 6/2014 |
| JP | 2015-141611 A | 8/2015 |
| JP | 2015-168369 A | 9/2015 |
| JP | 2016-192028 A | 11/2016 |
| JP | 2017-159754 A | 9/2017 |
| JP | 2017-159789 A | 9/2017 |
| WO | 2011/158347 A1 | 12/2011 |

AUTOMATIC DRIVING SYSTEM

INCORPORATION BY REFERENCE

The disclosure of Japanese Patent Application No. 2017-078396 filed on Apr. 11, 2017 including the specification, drawings and abstract is incorporated herein by reference in its entirety.

BACKGROUND

1. Technical Field

The present disclosure relates to an automatic driving system.

2. Description of Related Art

A system that executes automatic driving control of a vehicle is described, for example, in Japanese Patent Application Publication No. 2014-106854 (JP 2014-106854 A). When the system described in JP 2014-106854 A determines, while executing automatic driving control of the vehicle, that a condition for executing the automatic driving control is not met, this system gives a driver a notice prompting the driver to deactivate the automatic driving control. Moreover, this system calculates a parking location where the vehicle can be parked, such as a side strip with a sufficient width or an emergency parking bay. When the driver fails to deactivate the automatic driving control despite the notice prompting the driver to deactivate the automatic driving control, this system makes the vehicle travel automatically to the calculated parking location and stops the vehicle.

SUMMARY

In the case where a vehicle is made to travel automatically to a parking location due to failure of the driver to deactivate automatic driving control, it is not always easy to make the vehicle travel automatically to the parking location. In this case, it is difficult to continue the automatic driving control, which makes it desirable for the driver to take over the driving operation. To have the driver take over the driving operation, it is desirable that the automatic driving control be continued for as long a time as possible so as to allow the driver a long time to take over the driving operation.

With this in mind, the present inventors have developed an idea of creating a first travel plan that is used for normal automatic driving control and a second travel plan that assumes that the driver will take over the driving, and executing the automatic driving control based on the second travel plan when the reliability of the first travel plan is lower than the reliability of the second travel plan.

However, for example, a situation is likely to arise such as where the reliability of the first travel plan is lower than the reliability of the second travel plan that assumes that the driver will take over the driving, when the automatic driving control is resumed through an operation performed by the driver after the automatic driving control based on the second travel plan is switched to manual driving.

The present disclosure provides an automatic driving system that can avoid resuming the automatic driving control based on the second travel plan after deactivation of the automatic driving control.

An aspect provides an automatic driving system. The automatic driving system according to the aspect includes an electronic control unit configured: to recognize a position of a vehicle based on a measurement result of position measurement unit of the vehicle; to recognize an environment surrounding the vehicle based on a detection result of an external sensor configured to detect conditions outside the vehicle; to recognize a state of the vehicle based on a detection result of an internal sensor configured to detect the state of the vehicle; to create a first travel plan of the vehicle based on the position of the vehicle, the environment surrounding the vehicle, and the state of the vehicle; to calculate a first reliability of the first travel plan based on at least one of a reliability of the position of the vehicle, a reliability of a recognition of the environment surrounding the vehicle, a reliability of a recognition of the state of the vehicle, and the first travel plan; to create a second travel plan of the vehicle based on one or two of the position of the vehicle, the environment surrounding the vehicle, and the state of the vehicle; to calculate a second reliability of the second travel plan, based at least either on a recognition result used to create the second travel plan or on the second travel plan, the recognition result being among the reliability of the position of the vehicle, the environment surrounding the vehicle, and the state of the vehicle; to execute automatic driving control of the vehicle such that the vehicle travels based on the first travel plan; to execute the automatic driving control such that the vehicle travels based on the second travel plan while the first reliability of the first travel plan is lower than the second reliability of the second travel plan; to start, while the vehicle is not traveling by the automatic driving control, the automatic driving control such that the vehicle travels based on the first travel plan when the first reliability of the first travel plan is equal to or higher than the second reliability of the second travel plan; and not to start, while the vehicle is not traveling by the automatic driving control, the automatic driving control when the first reliability of the first travel plan is lower than the second reliability of the second travel plan.

In the aspect, the electronic control unit may be configured to deactivate the automatic driving control when a predetermined automatic driving deactivation condition is met, to resume, in a case where the automatic driving control is deactivated, the automatic driving control such that the vehicle travels based on the first travel plan, when the first reliability of the first travel plan is equal to or higher than the second reliability of the second travel plan, and not to resume, in a case where the automatic driving control is deactivated, the automatic driving control when the first reliability of the first travel plan is lower than the second reliability of the second travel plan.

In the case where the automatic driving control is deactivated, this automatic driving system does not resume the automatic driving control when the first reliability of the first travel plan is lower than the second reliability of the second travel plan. Thus, it is possible to avoid resuming the automatic driving control based on the second travel plan after deactivation of the automatic driving control.

In the aspect, the electronic control unit may be configured to resume the automatic driving control based on the first travel plan when a driver of the vehicle permits resumption of the automatic driving control based on the first travel plan, in a case where the automatic driving control is deactivated and the first reliability of the first travel plan is lower than the second reliability of the second travel plan.

This automatic driving system resumes the automatic driving control based on the first travel plan when the driver of the vehicle permits the resumption of the automatic driving control based on the first travel plan, even when the first reliability of the first travel plan is lower than the second reliability of the second travel plan after deactivation of the automatic driving control. Thus, the automatic driving control can be resumed in accordance with the driver's intention, which can improve the user-friendliness.

In the aspect, the electronic control unit may be configured to determine, when the automatic driving control is deactivated, whether the first travel plan is in accordance with a driving habit of a driver of the vehicle, based on a history of manual driving of the vehicle performed by the driver and on the first travel plan, and resume, even when the first reliability of the first travel plan is lower than the second reliability of the second travel plan, the automatic driving control based on the first travel plan by a request of the driver for starting the automatic driving control, when it is determined that the first travel plan is in accordance with the driving habit of the driver.

This automatic driving system resumes the automatic driving control based on the first travel plan upon a request of the driver for starting the automatic driving control when it is determined that the first travel plan is in accordance with the driving habit of the driver, even when the first reliability of the first travel plan is lower than the second reliability of the second travel plan after deactivation of the automatic driving control. It is highly likely that the driver feels comfortable with the first travel plan when the first travel plan is in accordance with the driving habit of the driver. In that case, therefore, even when the first reliability of the first travel plan is lower than the second reliability of the second travel plan, this automatic driving system resumes the automatic driving control based on the first travel plan upon a request of the driver for starting the automatic driving control, and can thereby improve the user-friendliness.

In the aspect, the electronic control unit may be configured to create the second travel plan based on the state of the vehicle.

In the aspect, the electronic control unit may be configured to determine whether the first travel plan is in accordance with the driving habit of the driver by comparing the first travel plan with at least one of a travel track of the vehicle, a speed of the vehicle, and a steering angle of the vehicle included in the history of the manual driving, and a future course of the vehicle predicted from the history of the manual driving.

As has been described above, the automatic driving system according to one aspect of the present disclosure can avoid resuming automatic driving control based on the second travel plan after deactivation of the automatic driving control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
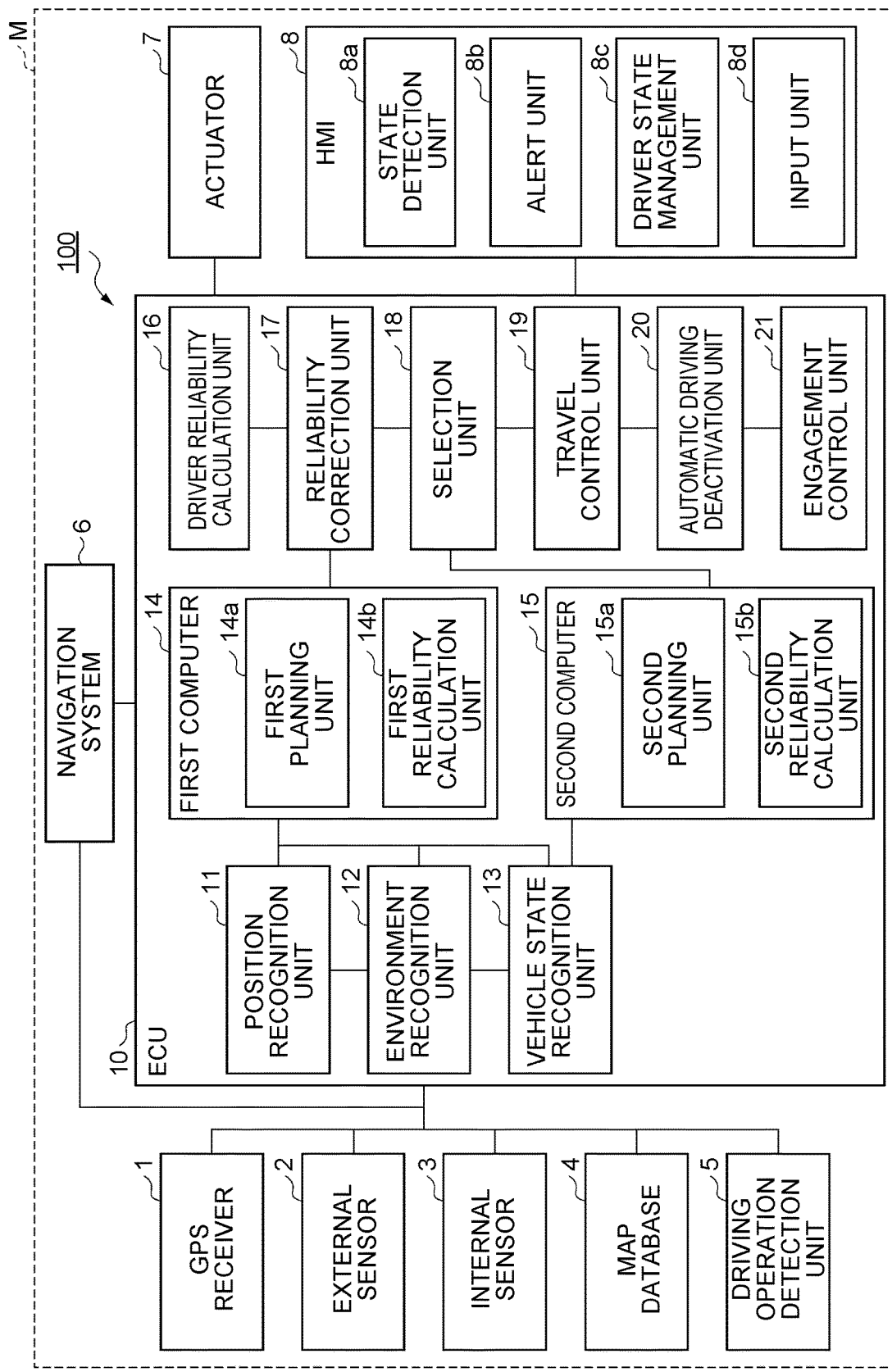
FIG. 1 is a block diagram showing an automatic driving system according to a first embodiment.

Embodiments of the present disclosure will be described below with reference to the drawings. The same or equivalent parts in the drawings will be denoted by the same reference sign and an overlapping description thereof will be omitted.

First Embodiment

FIG. 1 is a block diagram showing an automatic driving system according to a first embodiment. As shown in FIG. 1, an automatic driving system 100 according to the first embodiment is a system that is installed in a vehicle M, such as an automobile, and executes automatic driving control of the vehicle M. The automatic driving system 100 determines whether automatic driving is possible, and starts the automatic driving control of the vehicle M when it is determined that automatic driving is possible and moreover an automatic driving control starting operation (e.g., an operation of pressing an automatic driving control start button) is performed by the driver. The automatic driving control is vehicle control under which the vehicle M travels automatically along a preset target route. Under the automatic driving control, the vehicle M travels automatically, without requiring the driver to perform any driving operation. The target route is a route on a map to be traveled by the vehicle M under the automatic driving control.

The automatic driving system 100 includes an electronic control unit (ECU) 10 that executes the automatic driving control. The ECU 10 is an electronic control unit having a central processing unit (CPU), a read-only memory (ROM), a random-access memory (RAM), a controller area network (CAN) communication circuit, or the like. The ECU 10 realizes various functions by downloading a program stored in the ROM to the RAM and executing the program downloaded to the RAM by the CPU. The ECU 10 may be composed of a plurality of electronic control units. The ECU 10 is connected to a GPS receiver 1, an external sensor 2, an internal sensor 3, a map database 4, a driving operation detection unit 5, a navigation system 6, an actuator 7, and a human-machine interface (HMI) 8.

The GPS receiver 1 is installed in the vehicle M, and functions as a position measurement unit that measures the position of the vehicle M. The GPS receiver 1 measures the position of the vehicle M (e.g., the latitude and the longitude of the vehicle M) by receiving signals from three or more GPS satellites. The GPS receiver 1 sends information on the measured position of the vehicle M to the ECU 10.

The external sensor 2 is a detector that detects external conditions surrounding the vehicle M or the like. The external sensor 2 includes at least one of a camera, a radar, and a laser imaging detection and ranging (LIDAR) system. The external sensor 2 is also used to recognize white lines of a lane the vehicle M is traveling in as will be described later. The external sensor 2 may also be used to measure the position of the vehicle M.

The camera is an imaging apparatus that takes images of conditions outside the vehicle. The camera is provided behind the windshield of the vehicle M. The camera may be provided on right and left side surfaces of the vehicle M and a rear surface of the vehicle. The camera sends information on images taken of an area in front of the vehicle M to the ECU 10. The camera may be a monocular camera, or may be a stereo camera. The stereo camera has two imaging units that are disposed so as to reproduce a binocular disparity.

The radar detects obstacles around the vehicle M by means of radio wave (e.g., millimeter wave). The radar detects an obstacle by sending radio wave to a periphery of the vehicle M and receiving the radio wave reflecting off the obstacle. The radar sends information on the detected obstacle to the ECU 10. Examples of obstacles include immovable obstacles such as curbs, utility poles, other poles, guardrails, walls, buildings, and signboards and street signs provided at roadsides, as well as movable obstacles such as people, bicycles, and other vehicles.

The LIDAR system detects obstacles outside the vehicle M by means of light. The LIDAR system detects an obstacle by sending light to a periphery of the vehicle M, receiving the light reflecting off the obstacle, and measuring the distance to the reflection point. The LIDAR system sends information on the detected obstacle to the ECU 10. It is not absolutely necessary to provide both the LIDAR system and the radar.

The internal sensor 3 is a detector that detects the state of the vehicle M. The internal sensor 3 includes a vehicle speed sensor, an acceleration sensor, and a yaw rate sensor. The vehicle speed sensor is a detector that detects the speed of the vehicle M. A wheel speed sensor that is provided on a wheel of the vehicle M or on a driveshaft rotating integrally with a wheel and detects the rotation speed of the wheel is used as the vehicle speed sensor. The vehicle speed sensor sends information on the detected vehicle speed to the ECU 10.

The internal sensor 3 may include a steering angle sensor. The steering angle sensor is a sensor that detects the steering angle (actual steering angle) of the vehicle M. The steering angle sensor is provided on a steering shaft of the vehicle M. The steering angle sensor sends information on the detected steering angle to the ECU 10.

The acceleration sensor is a detector that detects the rate of acceleration of the vehicle M. The acceleration sensor includes a forward-backward acceleration sensor that detects the rate of acceleration of the vehicle M in a front-rear direction, and a lateral acceleration sensor that detects the rate of acceleration of the vehicle M in a lateral direction. The acceleration sensor sends information on the rate of acceleration of the vehicle M to the ECU 10. The yaw rate sensor is a detector that detects the yaw rate (rotational angular speed) of the vehicle M around a vertical axis at the center of gravity thereof. A gyroscope sensor can be used as the yaw rate sensor. The yaw rate sensor sends information on the detected yaw rate of the vehicle M to the ECU 10.

The map database 4 is a database that stores map information. The map information may include information on the positions of immovable obstacles. The map information may include information on the positions of white lines provided on roads. The map database 4 is built inside a hard disk drive (HDD) installed in the vehicle M. The map database 4 may connect to a server of a map information management center through wireless communication and periodically update the map information with the latest map information stored in the server of the map information management center. It is not absolutely necessary that the map database 4 is installed in the vehicle M. The map database 4 may instead be provided in a server or the like that is communicable with the vehicle M.

The map information may include information in which the frequency of switching from the automatic driving control to manual driving is associated with each place. The map information may include information in which the ratio of a time for which the vehicle M travels by manual driving to a time for which the vehicle M travels under the automatic driving control is associated with each predetermined area. This information allows a position recognition unit 11 or the like of the ECU 10 to recognize that some area has a higher ratio of the time for which the vehicle M is manually driven by the driver. The map database 4 may store a weather map showing a weather in each place. The map database 4 may store a disaster map showing a place where a disaster (an earthquake, a flood, or the like) is occurring.

The driving operation detection unit 5 detects a driving operation performed by the driver of the vehicle M. For example, the driving operation detection unit 5 includes an accelerator pedal sensor, a brake pedal sensor, and a steering wheel sensor. The driving operation detection unit 5 sends a detected driving operation performed by the driver (an amount of pressing on an accelerator pedal, an amount of pressing on a brake pedal, a steering angle, a steering torque, or the like) to the ECU 10.

The navigation system 6 is installed in the vehicle M, and sets a target route to be traveled by the vehicle M under the automatic driving control. The navigation system 6 computes the target route from the current position of the vehicle M to a preset destination, based on the destination, the current position of the vehicle M measured by the GPS receiver 1, and the map information in the map database 4. The destination under the automatic driving control is set by an occupant of the vehicle M operating an input button (or touch panel) of the navigation system 6. The navigation system 6 can set the target route by a publicly known method. The navigation system 6 may have a function of providing guidance in accordance with the target route during manual driving of the vehicle M performed by the driver. The navigation system 6 sends information on the target route of the vehicle M to the ECU 10. Some of the functions of the navigation system 6 may be executed by a server provided in a facility such as an information processing center that is communicable with the vehicle M. The functions of the navigation system 6 may be executed in the ECU 10.

Examples of the target route here include also a target route, like a "follow-the-road travel route" in the driving support device described in Japanese Patent No. 5382218 (WO 2011/158347) or the automatic driving device described in Japanese Patent Application Publication No. 2011-162132, that is automatically created based on a history of past destinations and map information when the destination is not explicitly set by the driver.

The actuator 7 is a device that executes travel control of the vehicle M. The actuator 7 includes at least an engine actuator, a brake actuator, and a steering actuator. The engine actuator controls a driving force of the vehicle M by controlling an amount of air supplied to an engine (throttle valve opening degree) according to a control signal from the ECU 10. In a case where the vehicle M is a hybrid electric vehicle, not only is the amount of air supplied to the engine controlled, but also a control signal from the ECU 10 is input into a motor serving as a power source, to control this driving force. In a case where the vehicle M is an electric vehicle, a control signal from the ECU 10 is input into the motor serving as a power source to control this driving force.

The brake actuator controls a braking force applied to wheels of the vehicle M by controlling a brake system according to a control signal from the ECU 10. A hydraulic brake system can be used as the brake system. The steering actuator controls driving of an assisting motor that is part of an electric power steering system and controls the steering torque, according to a control signal from the ECU 10. Thus, the steering actuator controls the steering torque of the vehicle M.

The HMI 8 is an interface that allows transmission and input of information between an occupant (e.g., the driver) of the vehicle M and the automatic driving system 100. The HMI 8 has a function of managing the attentiveness of the driver to the travel of the vehicle M. The HMI 8 includes a state detection unit 8a, an alert unit 8b, a driver state management unit 8c, and an input unit 8d. The state detection unit 8a is a device that detects the state of the driver. For example, the state detection unit 8a includes a camera that takes images of the driver, and detects the state (the posture, the direction of the face, or the like) of the driver by a known image processing technique or the like. The alert unit 8b is a device that alerts the driver. The alert unit 8b includes at least one of a display that presents image information to the driver and other occupants of the vehicle M and a speaker that outputs voice to them. The input unit 8d is a device of which a button or a touch panel is operated by an occupant to input various pieces of information. The input unit 8d may include a microphone that allows an occupant to input information by voice. For example, the automatic driving control start button is included in the input unit 8d.

The driver state management unit 8c manages the attentiveness of the driver to the travel of the vehicle M. Managing the attentiveness here means making the driver aware of the travel state (the speed, the steering angle, or the like) of the vehicle M and the conditions around the vehicle M. To manage the attentiveness of the driver, the driver state management unit 8c calls the driver's attention through the alert unit 8b based on the state of the driver detected by the state detection unit 8a. For example, when the state detection unit 8a detects that the driver is looking sideward, the driver state management unit 8c alerts the driver through the alert unit 8b to look forward. Thus, even while the automatic driving control is executed, a decrease in the attentiveness of the driver to the travel of the vehicle M can be suppressed. On the other hand, when the attentiveness of the driver to the travel of the vehicle M is high, it means that the driver is aware of the travel state of the vehicle M, the conditions around the vehicle M, or the like, and therefore the driver can immediately take over the driving operation as the automatic driving control is switched to manual driving.

When a travel plan different from a first travel plan is selected while the first travel plan is selected by a selection unit 18 to be described later, the HMI 8 may alert the driver through the alert unit 8b to the need for the driver to take over the driving operation. In other words, when the automatic driving control based on the first travel plan is to end, the HMI 8 may alert the driver to take over the driving operation. The HMI 8 includes an operation button, a touch panel, or the like that allows an occupant to perform an input operation. The HMI 8 sends information input by an occupant to the ECU 10.

Next, the functional configuration of the ECU 10 will be described. The ECU 10 includes the position recognition unit 11, an environment recognition unit 12, a vehicle state recognition unit 13, a first computer 14, a second computer 15, a driver reliability calculation unit 16, a reliability correction unit 17, the selection unit 18, a travel control unit 19, an automatic driving deactivation unit 20, and an engagement control unit 21.

The position recognition unit 11 recognizes the position of the vehicle M on a map based on the position information from the GPS receiver 1 and the map information in the map database 4. The position recognition unit 11 recognizes the position of the vehicle M as a combination of an x-coordinate and a y-coordinate in a Cartesian xy-coordinate system. The position recognition unit 11 may recognize or correct the position of the vehicle M based on the speed of the vehicle M recognized by the vehicle state recognition unit 13, in addition to the position information from the GPS receiver 1 and the map information in the map database 4. The position recognition unit 11 may recognize the position of the vehicle M by a simultaneous localization and mapping (SLAM) technique by using information on the positions of immovable obstacles, such as curbs, included in the map information in the map database 4 and the detection result of the external sensor 2. In this case, the external sensor 2, instead of the GPS receiver 1, functions as the position measurement unit. The position recognition unit 11 may recognize or correct the position of the vehicle M by a known image processing technique or the like by using the information on the positions of white lines included in the map information and the detection result of white lines by the external sensor 2. In this case, the external sensor 2 also functions as the position measurement unit.

For the position of the vehicle M, a center position of the vehicle M as seen from a vertical direction (in a plan view) can be used as a reference. The center position of the vehicle M is a position at the center of the vehicle M in a width direction as well as the center of the vehicle M in the front-rear direction.

The position recognition unit 11 calculates the reliability of the recognized position of the vehicle M. The reliability of the position of the vehicle M here represents the extent to which the recognized position of the vehicle M is credible. For example, the position recognition unit 11 may calculate the reliability of the position of the vehicle M based on a computation period of the position of the vehicle M. In this case, the position recognition unit 11 may assign a lower reliability to the position of the vehicle M when the computation period is equal to or longer than a predetermined period than when the computation period is shorter than the predetermined period.

For example, the position recognition unit 11 may calculate the reliability of the position of the vehicle M based on an acquisition period of the position information from the GPS receiver 1 or the like that has been used to recognize the position of the vehicle M. In this case, the position recognition unit 11 may assign a lower reliability to the position of the vehicle M when the acquisition period of the position information from the GPS receiver 1 or the like is equal to or longer than a predetermined period than when the acquisition period is shorter than the predetermined period. For example, the position recognition unit 11 may calculate the reliability of the position of the vehicle M based on a temporal change in the position information from the GPS receiver 1 or the like that has been used to recognize the position of the vehicle M. In this case, the position recognition unit 11 may assign a lower reliability to the position of the vehicle M when the temporal change in the position information from the GPS receiver 1 or the like is inconsistent (the change is discontinuous) than when the temporal change is consistent (the change is continuous).

For example, the position recognition unit 11 may calculate the reliability of the position of the vehicle M based on a recognition error in the recognition of the position of the vehicle M. The error here is small, for example, when the position of the vehicle M is narrowed down to one point, and is large, for example, when the position of the vehicle M is not narrowed down and the vehicle M is recognized to be present within a certain area. In this case, the position recognition unit 11 may assign a lower reliability to the position of the vehicle M when the error in the recognition of the position of the vehicle M is large than when this error is small. For example, in a case where the position recognition unit 11 recognizes the position of the vehicle M by using the detection result of immovable structures, white lines, or the like, around the vehicle M, the position recognition unit 11 may calculate the reliability of the position of the vehicle M based on the ratio of successful detection of immovable structures, white lines, or the like that have been used for the recognition. In this case, the position recognition unit 11 may assign a lower reliability to the position of the vehicle M when the ratio of successful detection of immovable structures, white lines, or the like is low than when the ratio of successful detection is high.

For example, the position recognition unit 11 may calculate the reliability of the position of the vehicle M based on the frequency of switching from the automatic driving control to manual driving that is associated with each place. The position recognition unit 11 can acquire, based on the map information, the frequency of switching from the automatic driving control to manual driving that is associated with each place. In this case, the position recognition unit 11 may assign a lower reliability to the position of the vehicle M when the recognized position of the vehicle M is located in a place where the frequency of switching from the automatic driving control to manual driving is high than when the recognized position is located in a place where this frequency is low. For example, the position recognition unit 11 may calculate the reliability of the position of the vehicle M based on the ratio of a time for which the vehicle travels by manual driving to a time for which the vehicle travels under the automatic driving control that is associated with each predetermined area. The position recognition unit 11 can acquire, based on the map information, the ratio of the time for which the vehicle travels by manual driving to the time for which the vehicle travels under the automatic driving control that is associated with each predetermined area. In this case, the position recognition unit 11 may assign a lower reliability to the position of the vehicle M when the recognized position of the vehicle M is located in an area where the ratio of the time of manual driving is high than when the recognized position is located in an area where this ratio is low.

For example, the position recognition unit 11 may calculate the reliability of the position of the vehicle M based on whether the map information stored in the map database 4 is available. In this case, the position recognition unit 11 may assign a lower reliability to the position of the vehicle M when the position of the vehicle M that the position recognition unit 11 is trying to recognize is located within an area for which no map information is available than when the position of the vehicle M is located within an area for which map information is available. For example, the position recognition unit 11 may calculate the reliability of the position of the vehicle M based on the freshness (newness) of the map information stored in the map database 4. In this case, the position recognition unit 11 may assign a lower reliability to the position of the vehicle M when the time of update of the map information is old than when the time of update of the map information is new.

For example, the position recognition unit 11 may calculate the reliability of the position of the vehicle M based on the weather map showing the weather in each place that is stored in the map database 4. In this case, the position recognition unit 11 may assign a lower reliability to the position of the vehicle M when the recognized position of the vehicle M is located in a place on the weather map where the weather is bad (e.g., rainy or snowy) than when the recognized position is located in a place where the weather is fine (e.g., sunny). For example, the position recognition unit 11 may calculate the reliability of the position of the vehicle M based on the disaster map showing a place where a disaster is occurring that is stored in the map database 4. In this case, the position recognition unit 11 may assign a lower reliability to the position of the vehicle M when the recognized position of the vehicle M is located in a place on the disaster map where a disaster is occurring than when the recognized position is located in a place where no disaster is occurring.

The position recognition unit 11 may calculate the reliability of the position of the vehicle M based on a plurality of reliabilities that is calculated by the above-described plurality of calculation methods of the reliability of the position of the vehicle M.

The environment recognition unit 12 recognizes the environment surrounding the vehicle M based on the detection result of the external sensor 2 that detects the conditions outside the vehicle M. The environment recognition unit 12 recognizes the environment surrounding the vehicle M by a publicly known technique, based on the images taken by the camera, the obstacle information from the radar, or the obstacle information from the LIDAR system. Specifically, the environment recognition unit 12 recognizes obstacles (immovable obstacles and movable obstacles) around the vehicle M based on the image information from the camera, the obstacle information from the radar, or the obstacle information from the LIDAR system. When a vehicle (other vehicle) is recognized as an obstacle, the environment recognition unit 12 recognizes the type of the recognized vehicle. As the type of the vehicle, the environment recognition unit 12 recognizes here, for example, whether the vehicle is an emergency vehicle (a police car, an ambulance, a fire-fighting vehicle, or the like) or a vehicle other than an emergency vehicle. For example, in a case where a camera is used, the type of the vehicle may be distinguished through a comparison between the shape of the recognized vehicle and predetermined shapes of emergency vehicles. When a vehicle (other vehicle) is recognized as an obstacle, the environment recognition unit 12 recognizes the state of the recognized vehicle. As the state of the vehicle, the environment recognition unit 12 recognizes here, for example, whether the hazard warning lights of the vehicle are on. Moreover, the environment recognition unit 12 recognizes the positions of the white lines of the lane the vehicle M is traveling in based on the image information from the camera or the obstacle information from the LIDAR system. The environment recognition unit 12 may further recognize the type of the white lines and the curvature of the white lines.

The environment recognition unit 12 calculates the reliability of the recognition of the environment surrounding the vehicle M. The reliability of the recognition of the environment surrounding the vehicle M here represents the extent to which the recognition of the environment surrounding the vehicle M is credible. For example, the environment recognition unit 12 may calculate the reliability of the recognition of the environment surrounding the vehicle M based on a computation period in the recognition of the environment surrounding the vehicle M. In this case, the environment recognition unit 12 may assign a lower reliability to the recognition of the environment surrounding the vehicle M when the computation period is equal to or longer than a predetermined period than when the computation period is shorter than the predetermined period.

For example, the environment recognition unit 12 may calculate the reliability of the recognition of the environment surrounding the vehicle M based on an acquisition period of the detection result of the external sensor 2. In this case, the environment recognition unit 12 may assign a lower reliability to the recognition of the environment surrounding the vehicle M when the acquisition period of the detection result of the external sensor 2 is equal to or longer than a predetermined period than when the acquisition period is shorter than the predetermined period. For example, the environment recognition unit 12 may calculate the reliability of the environment surrounding the vehicle M based on a temporal change in the recognized position or speed of an obstacle. In this case, the environment recognition unit 12 may assign a lower reliability to the recognition of the environment surrounding the vehicle M when the temporal change in the recognized position or speed of the obstacle is inconsistent (when the change is discontinuous or the amount of noise is large) than when the temporal change is consistent (when the change is continuous or the amount of noise is small).

For example, by looking at the temporal change in recognized objects, the environment recognition unit 12 may calculate the reliability of the recognition of the environment surrounding the vehicle M based on the number of times the obstacles split or combine. In this case, the environment recognition unit 12 may assign a lower reliability to the recognition of the environment surrounding the vehicle M when the number of times the obstacles split or combine is large than when the number of times the obstacles split or combine is small.

For example, the environment recognition unit 12 may calculate the reliability of the recognition of the environment surrounding the vehicle M based on the ratio of obstacles of which the obstacle type can be identified to a plurality of obstacles around the vehicle M. In this case, the environment recognition unit 12 may assign a lower reliability to the recognition of the environment surrounding the vehicle M when the ratio of obstacles of which the obstacle type can be identified is low than when this ratio is high. For example, the environment recognition unit 12 may calculate the reliability of the recognition of the environment surrounding the vehicle M based on the number of pedestrians present within a predetermined distance (Pm) from the vehicle M among the recognized obstacles. In this case, the environment recognition unit 12 may assign a lower reliability to the recognition of the environment surrounding the vehicle M when the number of pedestrians present within the predetermined distance is large than when the number of pedestrians is small. As with the case of pedestrians, the environment recognition unit 12 may calculate the reliability of the recognition of the environment surrounding the vehicle M based on the number of obstacles other than pedestrians that are present within the predetermined distance (Pm) from the vehicle M among obstacles other than pedestrians. In this case, too, the environment recognition unit 12 may assign a lower reliability to the recognition of the environment surrounding the vehicle M when the number of obstacles other than pedestrians that are present within the predetermined distance is large than when the number of obstacles other than pedestrians is small.

The environment recognition unit 12 may calculate the reliability of the recognition of the environment surrounding the vehicle M based on the width of the lane the vehicle M is traveling in. In this case, the environment recognition unit 12 calculates the width of the lane the vehicle M is traveling in based on the recognized positions of the white lines of the lane. The environment recognition unit 12 assigns a lower reliability to the recognition of the environment surrounding the vehicle M when the calculated width is small than when this width is large. While in this example the environment recognition unit 12 calculates the width of the lane based on the recognized white lines and calculates the reliability of the recognition of the environment surrounding the vehicle M based on the calculated width, this embodiment is not limited to the case where the environment recognition unit 12 calculates the width. For example, when the map database 4 includes information on the widths of lanes, the environment recognition unit 12 may acquire the width of the lane from the map database 4 based on the position of the vehicle M recognized by the position recognition unit 11. Then, the environment recognition unit 12 may calculate the reliability of the recognition of the environment surrounding the vehicle M based on the width acquired from the map database 4. Alternatively, the environment recognition unit 12 may calculate the width of the lane based on, for example, the positions of physical road borders (curbs, guardrails, walls, construction pylons, or the like) other than the positions of the white lines of the lane. When there is an object other than white lines and physical road borders that can be regarded as defining the road width, for example, when there is an oncoming vehicle on a road without a centerline, a half of the physical width of the road obtained based on the position of this oncoming vehicle may be regarded as the width of the lane. Alternatively, for example, when a pedestrian is walking on a roadside of a road having no road markings, the environment recognition unit 12 may calculate a hypothetical width of the lane based on a position at which a sufficient distance from the pedestrian is secured. The environment recognition unit 12 may calculate the reliability of the recognition of the environment surrounding the vehicle M based on the distance between the vehicle M and a road border. This road border may be a division line such as a white line, or an end of a region defined by a curb, wall, ditch, or the like where the vehicle can travel, or any other object suitable to be treated as a road border.

For example, the environment recognition unit 12 may calculate the reliability of the recognition of the environment surrounding the vehicle M based on whether the recognized vehicle around the vehicle M is an emergency vehicle. In this case, the environment recognition unit 12 may assign a lower reliability to the recognition of the environment surrounding the vehicle M when the ratio or the number of emergency vehicles around the vehicle M is high than when the ratio or the number of emergency vehicles is low. For example, the environment recognition unit 12 may calculate the reliability of the recognition of the environment surrounding the vehicle M based on whether the hazard warning lights of the recognized vehicle around the vehicle M are on. In this case, the environment recognition unit 12 may assign a lower reliability to the recognition of the environment surrounding the vehicle M when the ratio or the number of vehicles around the vehicle M of which the hazard warning lights are on is high than when the ratio or the number of the vehicles of which the hazard warning lights are on is low.

The environment recognition unit 12 may calculate the reliability of the recognition of the environment surrounding the vehicle M based on a plurality of reliabilities that is calculated based on the above-described plurality of calculation methods of the reliability of the recognition of the environment surrounding the vehicle M.

The vehicle state recognition unit 13 recognizes the state of the vehicle M including the speed and the direction of the vehicle M based on the detection result of the internal sensor 3. Specifically, the vehicle state recognition unit 13 recognizes the speed of the vehicle M based on the vehicle speed information from the vehicle speed sensor. The vehicle state recognition unit 13 recognizes the direction of the vehicle M based on the yaw rate information from the yaw rate sensor. The vehicle state recognition unit 13 recognizes the rate of acceleration of the vehicle M based on the rate-of-acceleration information from the acceleration sensor. The vehicle state recognition unit 13 recognizes the steering angle of the vehicle M based on the steering angle information from the steering angle sensor.

The vehicle state recognition unit 13 calculates the reliability of the recognition of the state of the vehicle M. The reliability of the recognition of the state of the vehicle M here represents the extent to which the recognition of the state of the vehicle M is credible. For example, the vehicle state recognition unit 13 may calculate the reliability of the recognition of the state of the vehicle M based on a computation period in the recognition of the state of the vehicle M. In this case, the vehicle state recognition unit 13 may assign a lower reliability to the recognition of the state of the vehicle M when the computation period is equal to or longer than a predetermined period than when the computation period is shorter than the predetermined period.

For example, the vehicle state recognition unit 13 may calculate the reliability of the recognition of the state of the vehicle M based on an acquisition period of the detection result of the internal sensor 3 that has been used to recognize the state of the vehicle M. In this case, the vehicle state recognition unit 13 may assign a lower reliability to the recognition of the state of the vehicle M when the acquisition period of the detection result of the internal sensor 3 is equal to or longer than a predetermined period than when this acquisition period is shorter than the predetermined period.

The vehicle state recognition unit 13 may calculate the reliability of the recognition of the state of the vehicle M based on a plurality of reliabilities that is calculated based on the above-described plurality of calculation methods of the reliability of the recognition of the state of the vehicle M.

The first computer 14 computes a first travel plan that is used for executing the automatic driving control of the vehicle M, and a first reliability that is the reliability of the first travel plan. The first computer 14 includes a first planning unit 14*a* and a first reliability calculation unit 14*b*.

The first planning unit 14*a* creates the first travel plan of the vehicle M such that the vehicle M travels along the target route set by the navigation system 6, based on the position of the vehicle M recognized by the position recognition unit 11, the surrounding environment recognized by the environment recognition unit 12, the state of the vehicle M recognized by the vehicle state recognition unit 13, and the map information in the map database 4. For example, the first travel plan is a travel plan from the current position of the vehicle M until the vehicle M reaches the preset destination.

The first planning unit 14*a* creates the first travel plan such that the vehicle M travels along the target route appropriately in light of criteria such as safety, observance of laws, and travel efficiency. The first travel plan includes driving actions such as avoiding an obstacle and changing lanes, in addition to following a vehicle in front and steering along the shape of the lane. The first travel plan is created based on the assumption that the HMI 8 is working normally and that the attentiveness of the driver is appropriately managed by the driver state management unit 8*c*. For example, the first planning unit 14*a* creates, as the first travel plan, a travel plan including a plurality of target positions along the target route and the speed at each target position. Thus, the first travel plan includes a route plan and a speed plan.

The first reliability calculation unit 14*b* calculates the first reliability of the first travel plan created by the first planning unit 14*a*. The first reliability represents the degree to which the vehicle M can travel appropriately in light of criteria such as safety, observance of laws, and travel efficiency. A high reliability of the first travel plan means high travel efficiency; for example, the vehicle is traveling while keeping at least a predetermined distance to an obstacle around the vehicle. For example, high travel efficiency here means that the distance the vehicle can travel per unit time is long. Examples of high travel efficiency may also include high fuel efficiency.

Specifically, the first reliability calculation unit 14*b* calculates the first reliability of the first travel plan based on at least one of the following: the reliability of the position of the vehicle M recognized by the position recognition unit 11; the reliability of the recognition of the environment surrounding the vehicle M recognized by the environment recognition unit 12; the reliability of recognition of the state of the vehicle M recognized by the vehicle state recognition unit 13; and the first travel plan created by the first planning unit 14*a*.

For example, the first reliability calculation unit 14*b* may calculate the first reliability of the first travel plan based on a creation period of the first travel plan in the first planning unit 14*a*. In this case, the first reliability calculation unit 14*b* may assign a lower first reliability to the first travel plan when the creation period of the first travel plan is equal to or longer than a predetermined period than when the creation period is shorter than the predetermined period.

For example, the first reliability calculation unit 14*b* may calculate the first reliability of the first travel plan based on the various reliabilities calculated by the position recognition unit 11, the environment recognition unit 12, and the vehicle state recognition unit 13. In this case, the first reliability calculation unit 14*b* may assign a lower first reliability to the first travel plan when the reliability of the position of the vehicle M calculated by the position recognition unit 11 is low than when the reliability of the position of the vehicle M is high. The first reliability calculation unit 14*b* may assign a lower first reliability to the first travel plan when the reliability of the recognition of the environment surrounding the vehicle M calculated by the environment recognition unit 12 is low than when the reliability of the recognition of the environment surrounding the vehicle M is high. The first reliability calculation unit 14*b* may assign a lower first reliability to the first travel plan when the reliability of the recognition of the state of the vehicle M calculated by the vehicle state recognition unit 13 is low than when the reliability of the recognition of the state of the vehicle M is high.

For example, the first reliability calculation unit 14*b* may calculate the first reliability of the first travel plan based on the number of obstacles present around the route in the first travel plan. In this case, the first reliability calculation unit 14*b* may assign a lower first reliability to the first travel plan when the number of the obstacles present around the route in the first travel plan is large than when the number of the obstacles is small, based on the created first travel plan and the surrounding environment recognized by the environment recognition unit 12. For example, the first reliability calculation unit 14*b* may calculate the first reliability of the first travel plan based on the distance between the vehicle M and an obstacle present around the route in the first travel plan. In this case, the first reliability calculation unit 14*b* may assign a lower first reliability to the first travel plan when the distance between the vehicle M and the obstacle present around the route in the first travel plan is shorter than a predetermined distance than when the distance between the vehicle M and the obstacle is equal to or longer than the predetermined distance, based on the created first travel plan and the surrounding environment recognized by the environment recognition unit 12.

For example, the first reliability calculation unit 14*b* may calculate the first reliability of the first travel plan based on the route in the first travel plan, the obstacle recognized by the environment recognition unit 12, and a physical blind spot of the external sensor 2 caused by an obstacle. The physical blind spot of the external sensor 2 here is an area that is a detection area of the external sensor 2 but cannot be detected by the external sensor 2 due to the presence of an obstacle. The detection area of the external sensor 2 is predetermined based on the installation direction of the external sensor 2 on the vehicle M or the like. Here is a specific example of the physical blind spot of the external sensor 2: For example, suppose that the road ahead of the vehicle M is a curved road, and that a building is present by the road ahead. This building is present on the nearer side (closer to the vehicle M) than the end of the curve, so that the end part of the curve is hidden by the building and invisible from the vehicle M. In this case, the external sensor 2 is blocked by the building standing by the road from detecting the end of the curve. The area blocked by the building (the area that cannot be detected by the external sensor 2) is the physical blind spot of the external sensor 2. In this case, the first reliability calculation unit 14*b* may assign a lower first reliability to the first travel plan when the number of blind spots of the external sensor 2 is large than when the number of blind spots is small.

For example, the first reliability calculation unit 14*b* may calculate the first reliability of the first travel plan based on the route in the first travel plan, the map information in the map database 4, and a sensor blind spot of the external sensor 2. The sensor blind spot of the external sensor 2 here is an area other than the detection area of the external sensor 2. Moreover, the sensor blind spot of the external sensor 2 is an area that is an area to be detected by the external sensor 2 when the vehicle M travels in accordance with the first travel plan but that is not included in the detection area of the external sensor 2. For example, when there is a lane merging into the route the vehicle M is traveling in (the route in the first travel plan) from a lateral side, this lane merging from the lateral side constitutes an area to be detected by the external sensor 2. When the detection area of the external sensor 2 provided on the vehicle M is limited to an area in front of the vehicle M, the external sensor 2 cannot detect the lane merging from the lateral side, since the direction of the lane is different from the direction of detection. Thus, the lane merging from the lateral side constitutes the sensor blind spot of the external sensor 2. In this case, the first reliability calculation unit 14*b* may assign a lower first reliability to the first travel plan when the number of the sensor blind spots is large than when the number of the sensor blind spots is small.

For example, the first reliability calculation unit 14*b* may calculate the first reliability of the first travel plan based on the number of times the vehicle M changes lanes, the number of times the lane merges, or the like that are obtained based on the route in the first travel plan and the map information in the map database 4. In this case, the first reliability calculation unit 14*b* may assign a lower first reliability to the first travel plan when the number of times the vehicle M changes lanes, the number of times the lane merges, or the like are large than when these numbers of times are small.

For example, the first reliability calculation unit 14*b* may calculate the first reliability of the first travel plan based on the degree of matching between the created first travel plan and a predetermined pattern of the travel plan that allows a stable travel. In this case, the first reliability calculation unit 14*b* may assign a lower first reliability to the first travel plan when the degree of matching between the created first travel plan and the predetermined pattern of the travel plan that allows a stable travel is low than when the degree of matching is high. For example, the first reliability calculation unit 14*b* may assign a lower first reliability to the first travel plan when the first travel plan includes merging into a priority road.

For example, the first reliability calculation unit 14*b* may calculate the first reliability of the first travel plan based on the degree of matching between the recognition results of the position recognition unit 11, the environment recognition unit 12, and the vehicle state recognition unit 13 that have been used to create the first travel plan, and a predetermined condition under which a travel plan can be stably created. In this case, the first reliability calculation unit 14*b* may assign a lower first reliability to the first travel plan when the degree of matching between the recognition result of the position recognition unit 11 or the like that have been used to create the first travel plan and the predetermined condition is low than when the degree of matching is high.

For example, the first reliability calculation unit 14*b* may calculate the first reliability of the first travel plan based on the degree of matching between the movement of a vehicle around the vehicle M recognized by the environment recognition unit 12 and the movement of the vehicle M in the created first travel plan. In this case, the first reliability calculation unit 14*b* may assign a lower first reliability to the first travel plan when the degree of matching between the movement of the vehicle around the vehicle M and the movement of the vehicle M in the first travel plan is low. For example, when, at an intersection having a traffic signal, the movement of the vehicle M in the first travel plan remains stationary despite the vehicle around the vehicle M having already started, the first reliability calculation unit 14*b* assigns a lower first reliability to the first travel plan.

The first reliability calculation unit 14*b* may calculate the first reliability of the first travel plan based on a plurality of reliabilities that is calculated by the above-described plurality of calculation methods.

The second computer 15 computes a second travel plan that is used for executing the automatic driving control of the vehicle M, and a second reliability that is the reliability of the second travel plan. The second computer 15 creates the second travel plan by a method different from that used by the first computer 14. The second computer 15 includes a second planning unit 15*a* and a second reliability calculation unit 15*b*.

The second planning unit 15*a* creates, as the second travel plan, a travel plan intended to allow the driver to easily take over the driving operation from a state in which the automatic driving control is executed based on the second travel plan. Specifically, the second travel plan is a travel plan that does not cause a significant change per unit time in the state of the vehicle M. Unlike the first travel plan, the second travel plan does not include driving actions such as avoiding an obstacle and changing lanes. When the movement of the vehicle M is gentle as when the vehicle M travels based on the second travel plan, after taking over the driving operation, the driver can easily adapt to the state of the vehicle M at the time when the driver takes over the driving operation. This means that, while the automatic driving control of the vehicle M is executed based on the second travel plan, the driver can easily take over the driving operation from the state where automatic driving is executed.

The second planning unit 15a creates the second travel plan of the vehicle M based on the state of the vehicle M recognized by the vehicle state recognition unit 13. Specifically, the second planning unit 15a creates the second travel plan such that at least one of the amount of change per unit time in the rates of acceleration and deceleration of the vehicle M and the amount of change per unit time in the steering of the vehicle M becomes smaller than a predetermined value, based on the current state (the speed, the rate of acceleration, the steering angle, or the like) of the vehicle M recognized by the vehicle state recognition unit 13. Thus, the second travel plan is a travel plan that does not cause a significant change in the movement of the vehicle M from the current state of the vehicle M. Therefore, the second planning unit 15a can create, as the second travel plan, a travel plan that is more moderate than the first travel plan created by the first planning unit 14a. For example, the second planning unit 15a creates a second travel plan in which the speed of the vehicle M is reduced from the current speed of the vehicle M at a lower rate of deceleration than a predetermined value. Thus, the second planning unit 15a creates the second travel plan by using only the recognition result of the vehicle state recognition unit 13, without using the recognition results of the position recognition unit 11 and the environment recognition unit 12.

The second planning unit 15a creates, as the second travel plan, a travel plan including a plurality of target positions to be traveled by the vehicle M and the speed at each target position, as with the first travel plan. Thus, the second travel plan includes a route plan and a speed plan.

The second reliability calculation unit 15b calculates the second reliability of the second travel plan created by the second planning unit 15a. The second reliability represents the degree to which the vehicle M can travel appropriately in light of criteria such as safety, observance of laws, and travel efficiency. Unlike the first travel plan, the second travel plan does not take the surrounding environment into account. Accordingly, the second reliability of the second travel plan is generally lower than the first reliability of the first travel plan.

Specifically, the second reliability calculation unit 15b calculates the second reliability of the second travel plan based at least either on the reliability of the recognition result that has been used by the second planning unit 15a to create the second travel plan, or on the second travel plan. Here, the second reliability calculation unit 15b calculates the second reliability of the second travel plan based at least either on the reliability of the recognition of the state of the vehicle M recognized by the vehicle state recognition unit 13, or on the second travel plan created by the second planning unit 15a.

For example, the second reliability calculation unit 15b may calculate the second reliability of the second travel plan based on a creation period of the second travel plan in the second planning unit 15a. In this case, the second reliability calculation unit 15b may assign a lower second reliability to the second travel plan when the creation period of the second travel plan is equal to or longer than a predetermined period than when the creation period is shorter than the predetermined period. For example, the second reliability calculation unit 15b may calculate the second reliability of the second travel plan based on the reliability of the recognition of the state of the vehicle M calculated by the vehicle state recognition unit 13. In this case, the second reliability calculation unit 15b may assign a lower second reliability to the second travel plan when the reliability of the recognition of the state of the vehicle M calculated by the vehicle state recognition unit 13 is low than when the reliability of the recognition of the state of the vehicle M is high.

The second reliability calculation unit 15b may calculate the second reliability of the second travel plan based on a plurality of reliabilities that is calculated based on the above-described plurality of calculation methods.

The driver reliability calculation unit 16 calculates the reliability of the driver state management unit 8c based on at least one of the reliability of the detection of the state detection unit 8a, the state of the state detection unit 8a, the state of the alert unit 8b, the state of the driver state management unit 8c, and the management state of the attentiveness of the driver in the driver state management unit 8c. The reliability of the driver state management unit 8c represents the degree to which the attentiveness of the driver is appropriately managed.

For example, the driver reliability calculation unit 16 may calculate the reliability of the driver state management unit 8c based on a detection period of the state of the driver in the state detection unit 8a. For example, the driver reliability calculation unit 16 may assign a lower reliability to the driver state management unit 8c when the detection period in the state detection unit 8a is equal to or longer than a predetermined period than when this detection period is shorter than the predetermined period.

For example, the driver reliability calculation unit 16 may assign a lower reliability to the driver state management unit 8c when the state detection unit 8a is not working normally than when the state detection unit 8a is working normally. The driver reliability calculation unit 16 may assign a lower reliability to the driver state management unit 8c when the alert unit 8b is not working normally than when the alert unit 8b is working normally. The driver reliability calculation unit 16 may assign a lower reliability to the driver state management unit 8c when the driver state management unit 8c is not working normally than when the driver state management unit 8c is working normally.

For example, the driver reliability calculation unit 16 may assign a lower reliability to the driver state management unit 8c when the attentiveness of the driver is not appropriately managed by the driver state management unit 8c than when the attentiveness of the driver is appropriately managed. The attentiveness of the driver is regarded to be appropriately managed, for example, when the driver responds to a call for attention from the alert unit 8b, or when the driver voluntarily checks the travel state of the vehicle M, the conditions around the vehicle M, or the like. Whether the driver is responding to a call for attention and whether the driver checks the travel state of the vehicle M or the like can be determined based on the detection result of the state detection unit 8a.

The driver reliability calculation unit 16 may calculate the reliability of the driver state management unit 8c based on a plurality of reliabilities that is calculated based on the above-described plurality of calculation methods of the reliability of the driver state management unit 8c.

The reliability correction unit 17 corrects the reliability of the first travel plan calculated by the first reliability calculation unit 14b, based on the reliability of the driver state management unit 8c calculated by the driver reliability calculation unit 16. The reliability correction unit 17 corrects the reliability of the first travel plan so as to be lower when the reliability of the driver state management unit 8c is lower. For example, when the reliability of the driver state management unit 8c calculated by the driver reliability calculation unit 16 is expressed by a value from 0 to 1, the reliability correction unit 17 may correct the reliability of the first travel plan by multiplying the reliability of the first travel plan by the value of the reliability of the driver state management unit 8c.

The selection unit 18 compares the reliability of the first travel plan corrected by the reliability correction unit 17 and the reliability of the second travel plan calculated by the second reliability calculation unit 15b, and selects a travel plan with a higher reliability of the first travel plan and the second travel plan.

The travel control unit 19 executes the automatic driving control of the vehicle M based on the travel plan selected by the selection unit 18. Specifically, the travel control unit 19 outputs a control signal according to the travel plan to the actuator 7. Thus, the travel control unit 19 controls the travel of the vehicle M such that the vehicle M travels automatically in accordance with the travel plan. Specifically, when the first reliability of the first travel plan is equal to or higher than the second reliability of the second travel plan, the travel control unit 19 executes the automatic driving control based on the first travel plan. When the first reliability of the first travel plan is lower than the second reliability of the second travel plan, the travel control unit 19 executes the automatic driving control based on the second travel plan.

Even when an automatic driving control start operation has been performed, the travel control unit 19 is not required to start the automatic driving control until the first reliability of the first travel plan becomes equal to or higher than the second reliability of the second travel plan. Specifically, in a case where the automatic driving control is not started until the engine of the vehicle M is started, the travel control unit 19 may execute only the automatic driving control based on the first travel plan without starting the automatic driving control based on the second travel plan. In the case where the automatic driving control is not started until the engine of the vehicle M is started, the travel control unit 19 may start the automatic driving control when the first reliability of the first travel plan is equal to or higher than the second reliability of the second travel plan, and may not start the automatic driving control when the first reliability of the first travel plan is lower than the second reliability of the second travel plan. The automatic driving control is not resumed when conditions required for starting the automatic driving control are not met due to the road condition or the state of the vehicle M (sensor failure or the like). Publicly known conditions according to the position of the vehicle M on a map or the like can be used as the conditions required for starting the automatic driving control.

The automatic driving deactivation unit 20 deactivates the automatic driving control when a predetermined automatic driving deactivation condition is met while the automatic driving control of the vehicle M is executed. For example, the automatic driving deactivation condition is a condition that is met when the first reliability of the first travel plan becomes lower than a first deactivation threshold value, and moreover the second reliability of the second travel plan becomes lower than a second deactivation threshold value. The first deactivation threshold value and the second deactivation threshold value are predetermined values. The automatic driving deactivation unit 20 deactivates the automatic driving control when it is determined that the automatic driving deactivation condition is met based on the first reliability of the first travel plan and the second reliability of the second travel plan. As the automatic driving control is deactivated, the vehicle M switches to manual driving. Publicly known driving support control for supporting the driver in driving may be started at the same time as the vehicle M switches to manual driving.

When the reliability of the recognition of the state of the vehicle M becomes lower than a deactivation threshold value due to sensor failure or the like, the automatic driving deactivation unit 20 may determine that the automatic driving deactivation condition is met. When the vehicle M enters a zone or region for which the map information is not accurate enough, the automatic driving deactivation unit 20 may determine that the automatic driving deactivation condition is met.

The automatic driving deactivation unit 20 determines whether an override operation has been performed while the automatic driving control of the vehicle M is executed. The automatic driving deactivation unit 20 determines whether an override operation has been performed, based on a driving operation detected by the driving operation detection unit 5 or an input to the HMI 8.

The override operation is an operation performed by the driver to deactivate the automatic driving control. Examples of override operations include an operation of pressing an automatic driving control end button in the input unit 8d of the HMI 8. The override operations may include at least one of an operation of turning the steering wheel to a steering angle equal to or larger than a steering angle threshold value, an operation of applying a steering torque equal to or larger than a steering torque threshold value to the steering wheel, an operation of pressing the accelerator pedal in an amount equal to or larger than an accelerator pedal threshold value, and an operation of pressing the brake pedal in an amount equal to or larger than a brake pedal threshold value.

The automatic driving deactivation unit 20 deactivates the automatic driving control when it is determined that an override operation has been performed. In a case where the automatic driving deactivation unit 20 deactivates the automatic driving control after determining that the automatic driving deactivation condition is met or an override operation has been performed, the automatic driving deactivation unit 20 may notify the driver that the automatic driving control will be deactivated. When an override operation is performed, the automatic driving deactivation unit 20 may determine that the automatic driving deactivation condition is met. In other words, an override operation may be included as one of the automatic driving deactivation conditions.

The engagement control unit 21 controls the resumption of the automatic driving control when the automatic driving control is deactivated by the automatic driving deactivation unit 20. Here, a triggered engagement and an automatic engagement for resuming the automatic driving control will be described. The triggered engagement and the automatic engagement correspond to a request of the driver for the resumption of automatic driving.

The triggered engagement means starting the automatic driving control of the vehicle M when an automatic driving control starting operation is input by the driver. When the automatic driving control is deactivated by the automatic driving deactivation unit 20, an input of an automatic driving control starting operation causes the engagement control unit 21 to start a process of resuming the automatic driving control as the triggered engagement. Alternatively, the engagement control unit 21 may execute the triggered engagement only when the conditions required for starting the automatic driving control are met.

The automatic engagement means automatically starting the automatic driving control of the vehicle when automatic engagement conditions are met. The automatic engagement conditions are conditions for starting the automatic driving control by the automatic engagement. One example of the automatic engagement conditions may be that the vehicle has reached an automatic engagement starting point that is preset on a map. Examples of automatic engagement starting points include an inlet point of an automatic driving-only lane. The automatic engagement conditions may include publicly known conditions required for starting automatic driving control. The automatic engagement is executed only when the automatic engagement is permitted (set) in advance by an occupant of the vehicle M.

In a case where the automatic driving control is deactivated by the automatic driving deactivation unit 20 and the automatic engagement has been permitted in advance by an occupant of the vehicle M, the engagement control unit 21 starts a process of resuming the automatic driving control as the automatic engagement when the automatic engagement conditions are met.

Upon starting the process of resuming the automatic driving control, the engagement control unit 21 compares the first reliability of the first travel plan and the second reliability of the second travel plan. Thus, creation of the first travel plan and the second travel plan and calculation of the first reliability and the second reliability are still executed even after deactivation of the automatic driving control.

When the first reliability of the first travel plan is equal to or higher than the second reliability of the second travel plan, the engagement control unit 21 resumes the automatic driving control based on the first travel plan. However, the automatic driving control is not resumed when the conditions required for starting the automatic driving control are not met due to the road condition or the state of the vehicle M (sensor failure or the like).

On the other hand, when the first reliability of the first travel plan is lower than the second reliability of the second travel plan, the engagement control unit 21 does not resume the automatic driving control. In other words, manual driving is continued.

Figure 2:
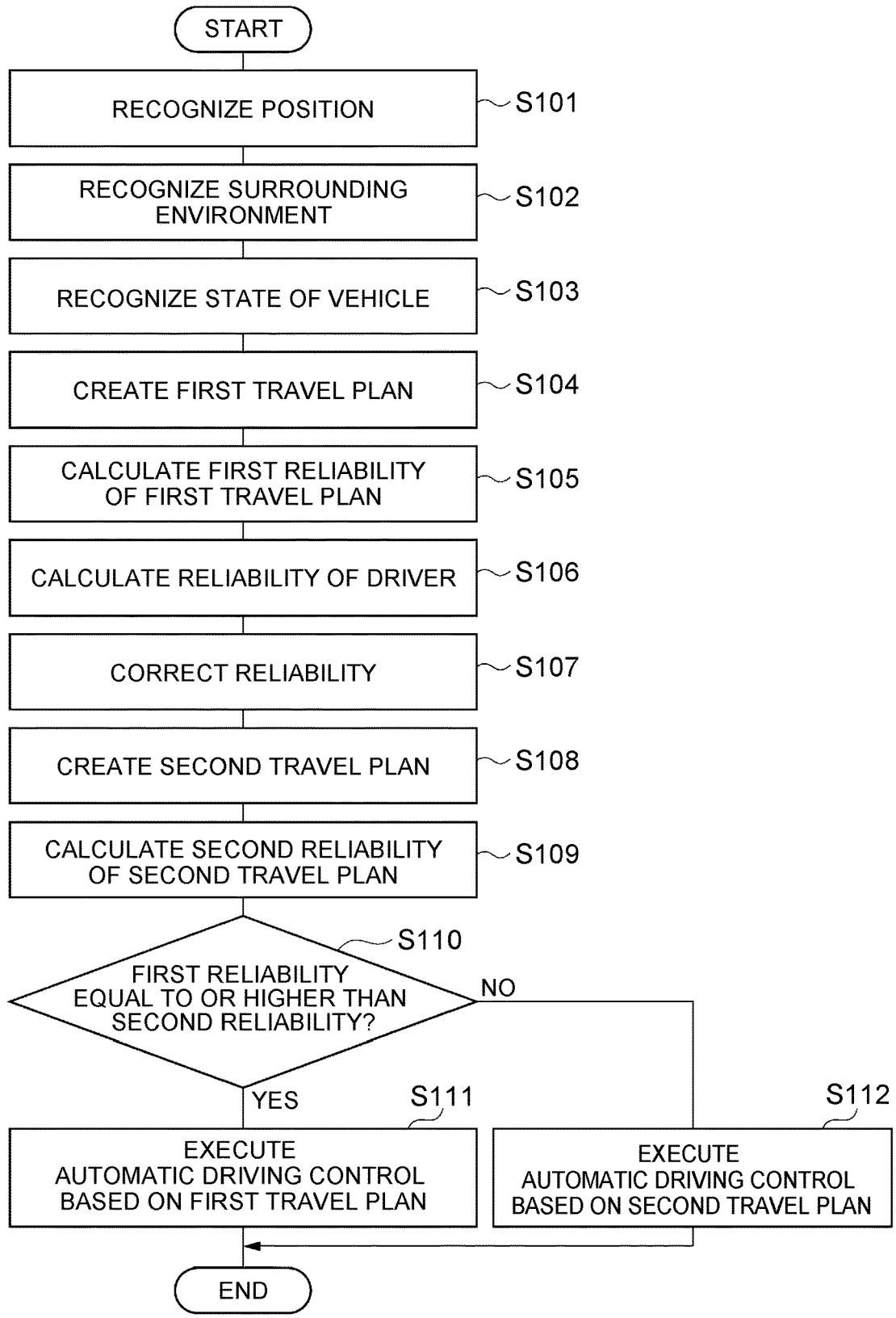
FIG. 2 is a flowchart showing a process of automatic driving control.

Next, the flows of processes executed by the ECU 10 will be described using the flowcharts shown in FIG. 2 to FIG. 4. FIG. 2 is a flowchart showing a process of the automatic driving control. The process of the automatic driving control is executed by the ECU 10 when an automatic driving control starting operation is performed.

As shown in FIG. 2, the position recognition unit 11 of the ECU 10 recognizes the position of the vehicle M (S101). The environment recognition unit 12 recognizes the environment surrounding the vehicle M (S102). The vehicle state recognition unit 13 recognizes the state of the vehicle M (S103). The order of execution of steps S101 to S103 is not limited to this order, and these steps may instead be executed in parallel. The first planning unit 14*a* creates the first travel plan based on the recognition result of the position recognition unit 11 or the like (S104). The first reliability calculation unit 14*b* calculates the first reliability of the created first travel plan (S105).

The driver reliability calculation unit 16 calculates the reliability of the driver state management unit 8*c* based on the reliability of the detection of the state detection unit 8*a* or the like (S106). The reliability correction unit 17 corrects the first reliability of the first travel plan based on the reliability of the driver state management unit 8*c* (S107). The second planning unit 15*a* creates the second travel plan of the vehicle M based on the state of the vehicle M (S108). The second reliability calculation unit 15*b* calculates the second reliability of the created second travel plan (S109). The order of execution of steps S104 to S107 and steps S108 and S109 is not limited to steps S108 and S109 being executed after steps S104 to S107. For example, steps S104 to S107 and steps S108 and S109 may be executed in parallel.

The selection unit 18 determines whether the first reliability of the first travel plan is equal to or higher than the second reliability of the second travel plan (S110). When it is determined that the first reliability of the first travel plan is equal to or higher than the second reliability of the second travel plan (S110: YES), the ECU 10 proceeds to step S111. When it is determined that the first reliability of the first travel plan is lower than the second reliability of the second travel plan (S110: NO), the ECU 10 proceeds to step S112.

In step S111, the travel control unit 19 executes the automatic driving control of the vehicle M based on the first travel plan. In step S112, the travel control unit 19 executes the automatic driving control of the vehicle M based on the second travel plan. After step S111 or S112, the ECU 10 repeats the process from step S101 as long as the automatic driving control continues.

Next, a process of deactivating automatic driving will be described using FIG. 3. FIG. 3 is a flowchart showing the process of deactivating automatic driving. The flowchart shown in FIG. 3 is executed while the automatic driving control is executed.

Figure 3:
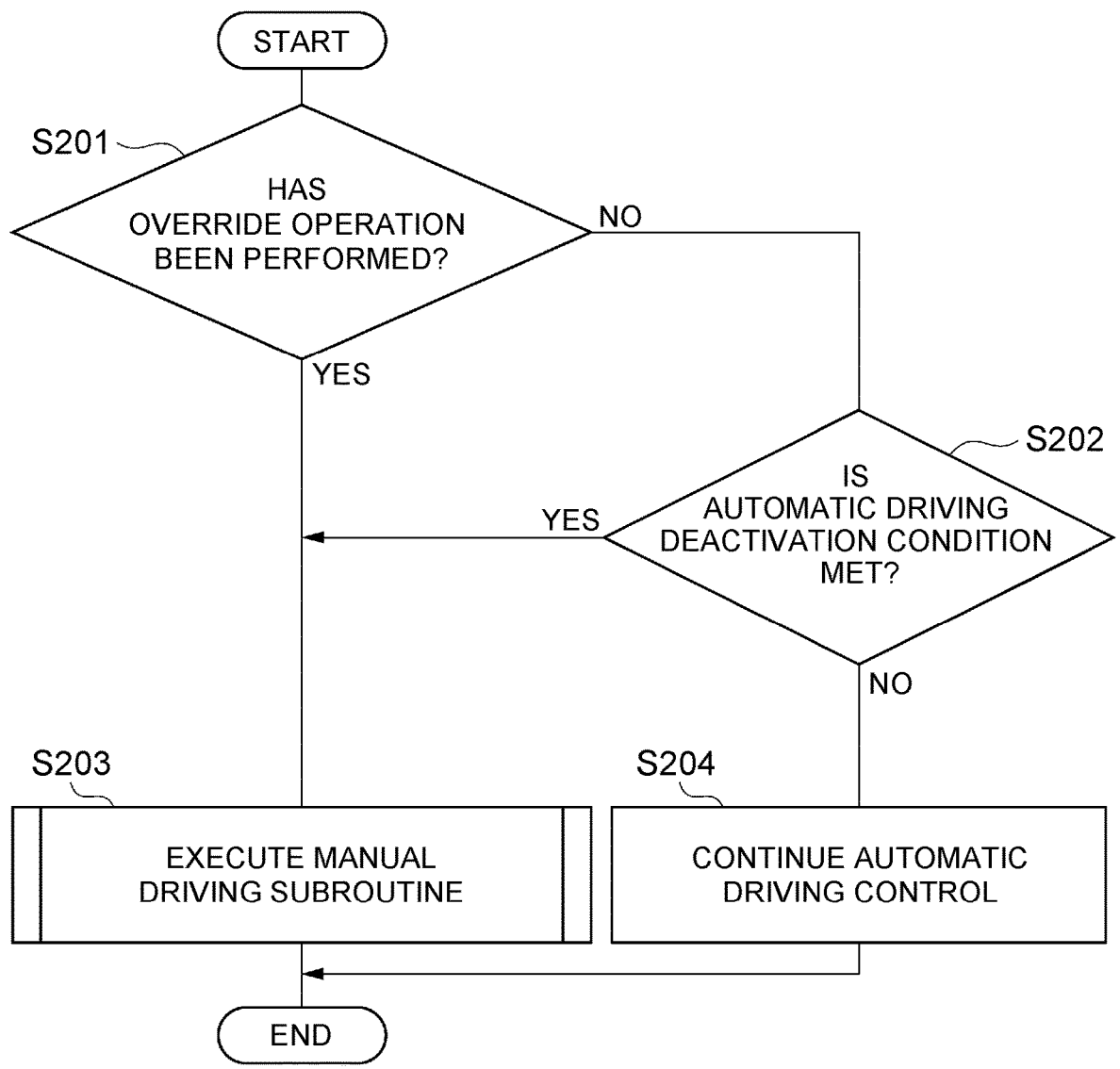
FIG. 3 is a flowchart showing a process of deactivating automatic driving.

As shown in FIG. 3, the automatic driving deactivation unit 20 of the ECU 10 determines whether an override operation has been performed (S201). When it is determined that no override operation has been performed (S201: NO), the ECU 10 proceeds to step S202. When it is determined that an override operation has been performed (S201: YES), the ECU 10 proceeds to step S203.

In step S202, the automatic driving deactivation unit 20 determines whether the automatic driving deactivation conditions are met. When it is determined that the automatic driving deactivation conditions are met (S202: YES), the ECU 10 proceeds to step S203. When it is determined that the automatic driving deactivation conditions are not met (S202: NO), the ECU 10 proceeds to step S204.

In step S203, the ECU 10 starts a manual driving subroutine. The manual driving subroutine will be described later. In step S204, the ECU 10 continues the automatic driving control. In other words, the automatic driving deactivation unit 20 does not deactivate the automatic driving control. Then, the ECU 10 repeats the process from step S201 as long as the automatic driving control continues.

Next, the manual driving subroutine will be described using FIG. 4. FIG. 4 is a flowchart showing the manual driving subroutine.

Figure 4:
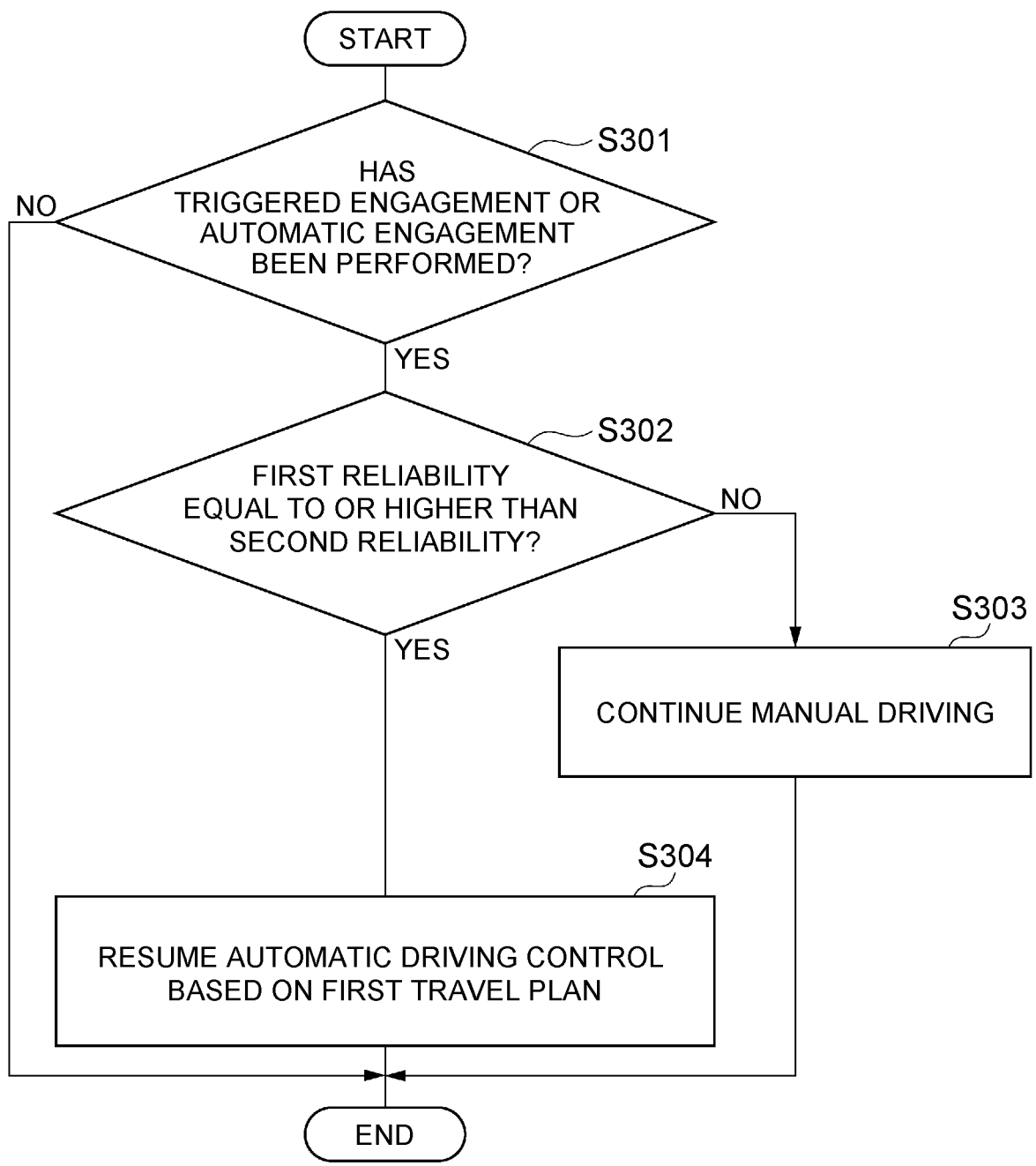
FIG. 4 is a flowchart showing a manual driving subroutine.

As shown in FIG. 4, the engagement control unit 21 of the ECU 10 determines whether the triggered engagement or the automatic engagement has been performed (S301). When it is determined that neither the triggered engagement nor the automatic engagement has been performed (S301: NO), the ECU 10 ends the current process. Then, the ECU 10 repeats the process from step S301. When it is determined that the triggered engagement or the automatic engagement has been performed (S301: YES), the ECU 10 proceeds to step S302.

In step S302, the engagement control unit 21 determines whether the first reliability of the first travel plan is equal to or higher than the second reliability of the second travel plan. When it is determined that the first reliability of the first travel plan is equal to or higher than the second reliability of the second travel plan (S302: YES), the ECU 10 proceeds to step S304. When it is determined that the first reliability of the first travel plan is lower than the second reliability of the second travel plan (S302: NO), the ECU 10 proceeds to step S303.

In step S303, the engagement control unit 21 continues manual driving without resuming the automatic driving control. In step S304, the engagement control unit 21 resumes the automatic driving control based on the first travel plan.

The automatic driving system 100 according to the first embodiment having been described above does not resume the automatic driving control when the first reliability of the first travel plan is lower than the second reliability of the second travel plan in the case where the automatic driving control is deactivated. Thus, this automatic driving system can avoid resuming the automatic driving control based on the second travel plan that is intended to allow the driver to easily take over the driving operation.

The automatic driving system 100 continues the automatic driving control based on the second travel plan even when the automatic driving control based on the first travel plan becomes difficult and the driving operation is to be taken over by the driver. Thus, the driver is allowed a long time to take over the driving operation. Then, the driver can easily take over the driving operation from the state where the automatic driving control based on the second travel plan is executed.

Second Embodiment

Figure 5:
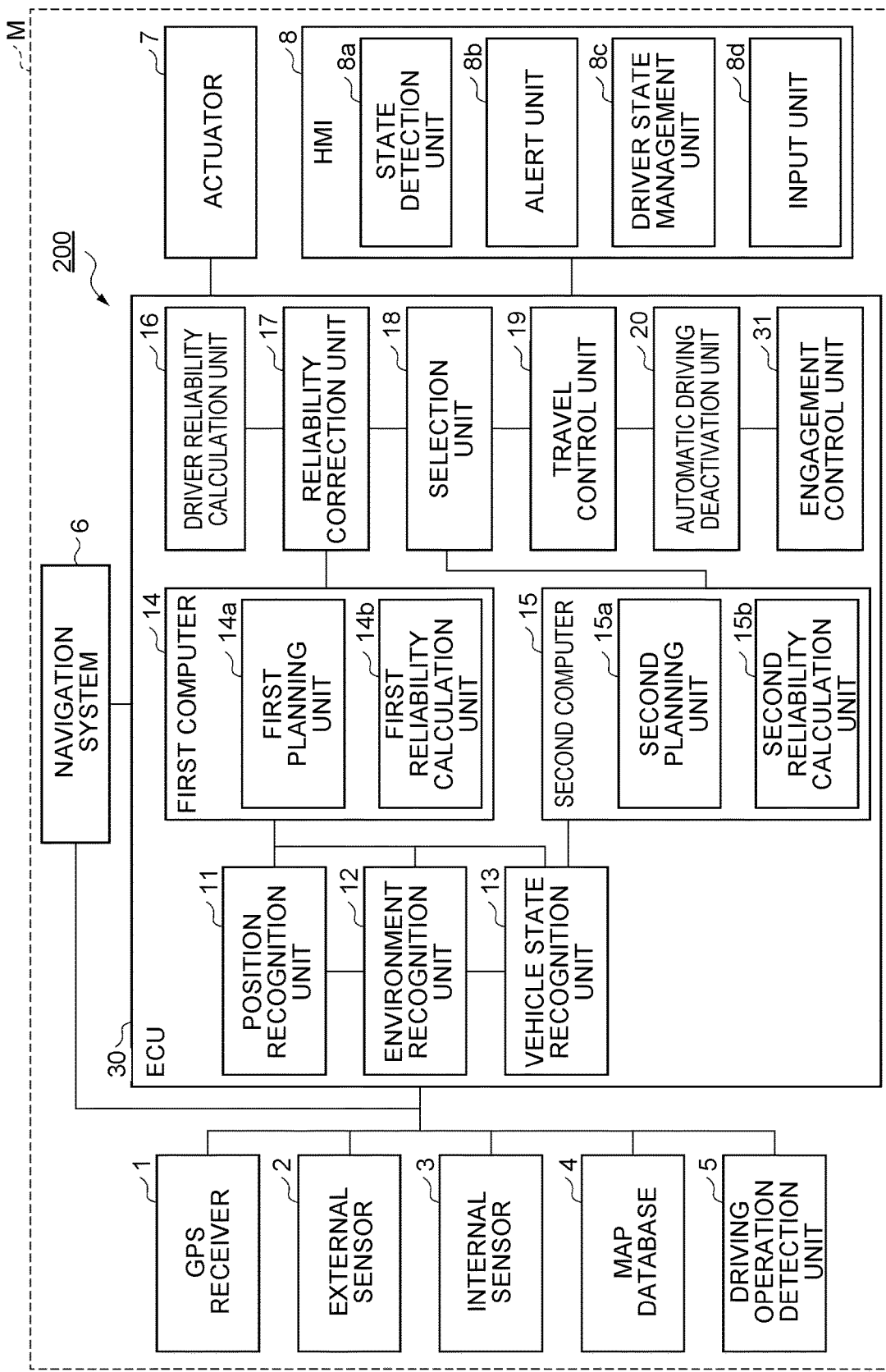
FIG. 5 is a block diagram showing an automatic driving system according to a second embodiment.

FIG. 5 is a block diagram showing an automatic driving system according to a second embodiment. An automatic driving system 200 according to the second embodiment shown in FIG. 5 is different from the automatic driving system according to the first embodiment in that the system resumes the automatic driving control based on the first travel plan when the driver permits the resumption of the automatic driving control based on the first travel plan, even when the first reliability of the first travel plan is lower than the second reliability of the second travel plan after deactivation of the automatic driving control.

Specifically, when the first reliability of the first travel plan is lower than the second reliability of the second travel plan after an engagement control unit 31 of an ECU 30 of the automatic driving system 200 starts the process of resuming the automatic driving control, the engagement control unit 31 notifies the driver of this status.

The engagement control unit 31 notifies the driver that the first reliability of the first travel plan is lower than the second reliability of the second travel plan, and that the driver is required to permit the resumption of the automatic driving control based on the first travel plan. The engagement control unit 31 notifies the driver through the alert unit 8b of the HMI 8. Provided that these messages are communicated to the driver, the specific content of notification is not limited. This notification is given through at least one of image display and voice output. However, this notification is not absolutely necessary.

The engagement control unit 31 determines, based on an input to the HMI 8, whether the driver has permitted the resumption of the automatic driving control based on the first travel plan. When a predetermined permit operation is performed, the engagement control unit 31 determines that the driver has permitted the resumption of the automatic driving control based on the first travel plan. Examples of the permit operations include an operation of pressing the automatic driving control start button, an operation of pressing a dedicated permit button, and an operation of inputting a permit by voice, all performed by the driver. This button may be a touch panel. When a certain time has elapsed without a permit operation being performed by the driver, the engagement control unit 31 determines that the resumption of the automatic driving control based on the first travel plan has not been permitted.

When the driver has permitted the resumption of the automatic driving control based on the first travel plan, the engagement control unit 31 resumes the automatic driving control based on the first travel plan even when the first reliability of the first travel plan is lower than the second reliability of the second travel plan. However, the automatic driving control is not resumed when the conditions required for starting the automatic driving control are not met due to sensor failure or the like.

Figure 6:
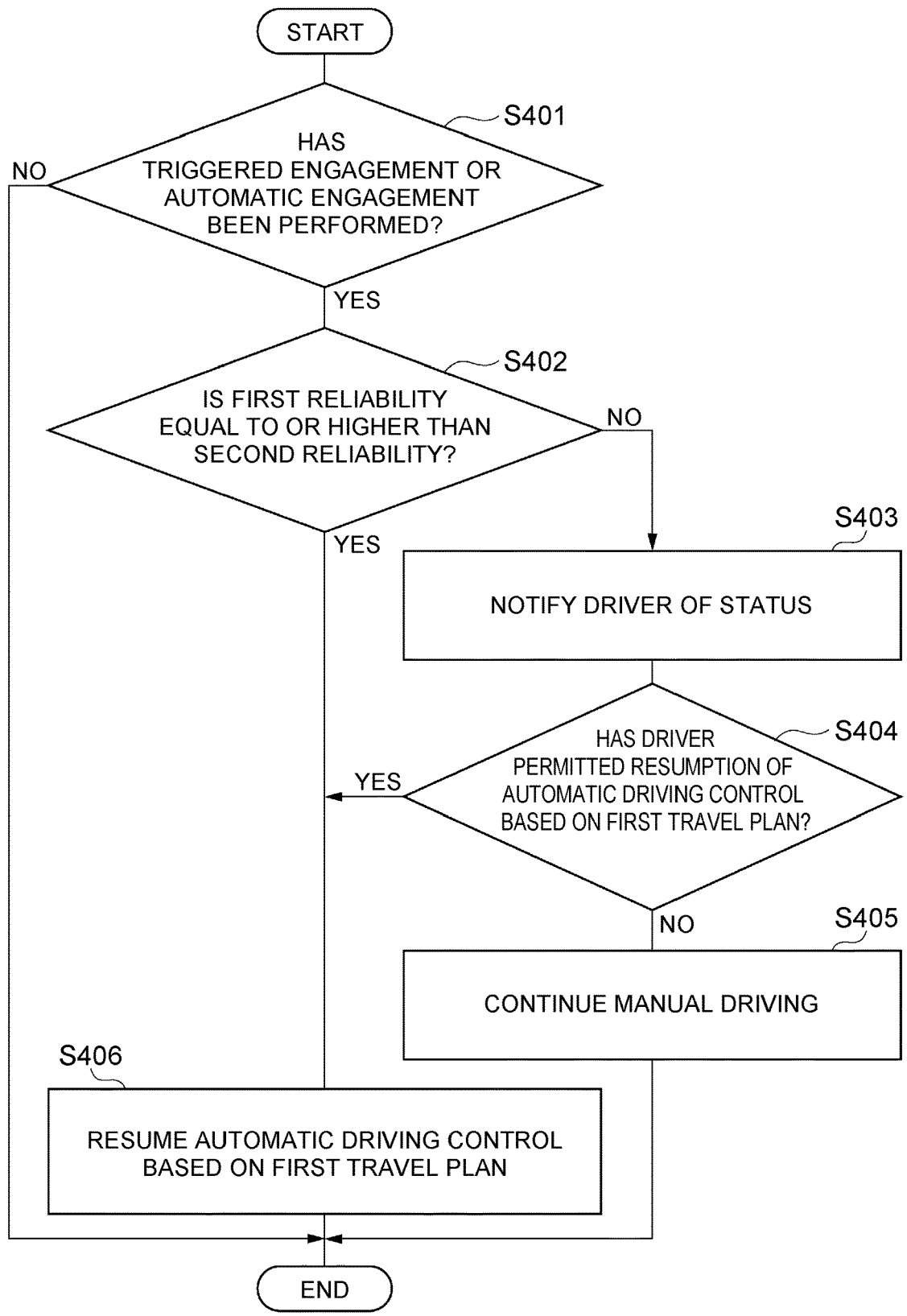
FIG. 6 is a flowchart showing a manual driving subroutine according to the second embodiment.

Next, a manual driving subroutine according to the second embodiment will be described using FIG. 6. FIG. 6 is a flowchart showing the manual driving subroutine according to the second embodiment. The process of the automatic driving control and the process of deactivating automatic driving are the same as those of the first embodiment, and therefore description thereof will be omitted.

As shown in FIG. 6, the engagement control unit 31 of the ECU 30 determines whether the triggered engagement or the automatic engagement has been performed (S401). When it is determined that neither the triggered engagement nor the automatic engagement has been performed (S401: NO), the ECU 30 ends the current process. Then, the ECU 30 repeats the process from step S401. When it is determined that the triggered engagement or the automatic engagement has been performed (S401: YES), the ECU 30 proceeds to step S402.

In step S402, the engagement control unit 31 determines whether the first reliability of the first travel plan is equal to or higher than the second reliability of the second travel plan. When it is determined that the first reliability of the first travel plan is equal to or higher than the second reliability of the second travel plan (S402: YES), the ECU 30 proceeds to step S406. When it is determined that the first reliability of the first travel plan is lower than the second reliability of the second travel plan (S402: NO), the ECU 30 proceeds to step S403.

In step S403, the engagement control unit 31 notifies the driver of the status through the alert unit 8b of the HMI 8. The engagement control unit 31 notifies the driver that the first reliability of the first travel plan is lower than the second reliability of the second travel plan, and that the driver is required to permit the resumption of the automatic driving control based on the first travel plan. Then, the ECU 30 proceeds to step S404.

In step S404, the engagement control unit 31 determines, based on an input to the HMI 8, whether the driver has permitted the resumption of the automatic driving control based on the first travel plan. When it is determined that the driver has permitted the resumption of the automatic driving control based on the first travel plan (S404: YES), the ECU 30 proceeds to step S406. When it is determined that the driver has not permitted the resumption of the automatic driving control based on the first travel plan (S404: NO), the ECU 30 proceeds to step S405.

In step S405, the engagement control unit 31 continues manual driving without resuming the automatic driving control. In step S406, the engagement control unit 31 resumes the automatic driving control based on the first travel plan.

In a case where the driver has permitted the resumption of the automatic driving control based on the first travel plan and the automatic driving control based on the first travel plan is resumed, the travel control unit 19 of the ECU 30 continues the automatic driving control based on the first travel plan without switching to the second travel plan, even when the status in which the first reliability of the first travel plan is lower than the second reliability of the second travel plan continues.

In a case where even once the first reliability of the first travel plan becomes equal to or higher than the second reliability of the second travel plan after the driver has permitted the resumption of the automatic driving control based on the first travel plan and the automatic driving control based on the first travel plan is resumed, the travel control unit 19 may switch the automatic driving control based on the first travel plan to the automatic driving control based on the second travel plan when thereafter the first reliability of the first travel plan becomes lower than the second reliability of the second travel plan.

The automatic driving system 200 according to the second embodiment having been described above resumes the automatic driving control based on the first travel plan when the driver of the vehicle M permits the resumption of the automatic driving control based on the first travel plan, even when the first reliability of the first travel plan is lower than the second reliability of the second travel plan after deactivation of the automatic driving control. Thus, the automatic driving control can be resumed according to the driver's intention, which can improve the user-friendliness.

Third Embodiment

Figure 7:
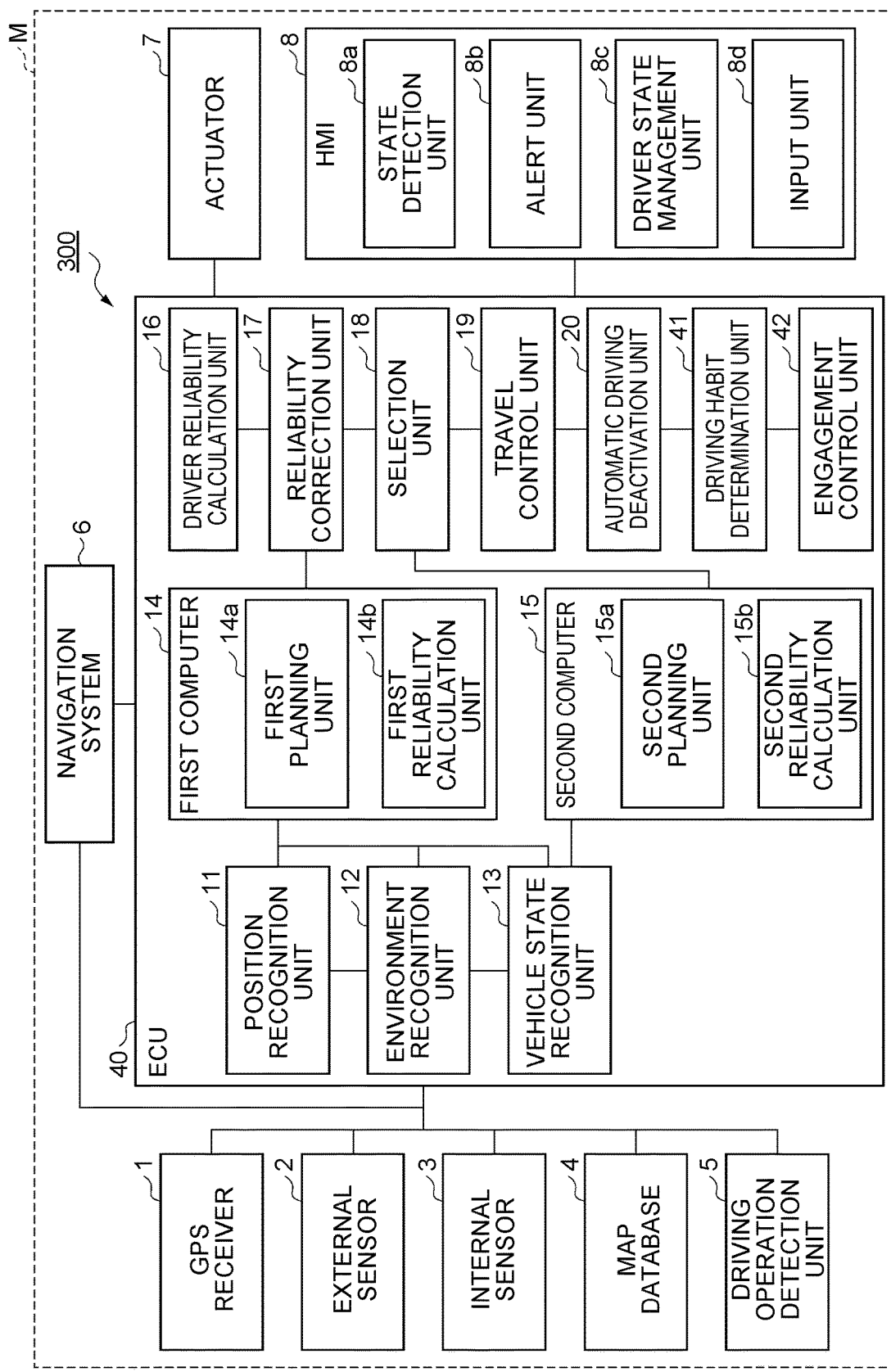
FIG. 7 is a block diagram showing an automatic driving system according to a third embodiment.

FIG. 7 is a block diagram showing an automatic driving system according to a third embodiment. An automatic driving system 300 according to the third embodiment shown in FIG. 7 is different from the automatic driving system according to the first embodiment in that the system resumes the automatic driving control based on the first travel plan when it is determined that the first travel plan is in accordance with the driving habit of the driver, even when the first reliability of the first travel plan is lower than the second reliability of the second travel plan after deactivation of the automatic driving control.

Specifically, an ECU 40 of the automatic driving system 300 has a driving habit determination unit 41. In the case where the automatic driving control is deactivated by the automatic driving deactivation unit 20, the driving habit determination unit 41 determines whether the first travel plan is in accordance with the driving habit of the driver based on a history of manual driving of the vehicle M performed by the driver and the first travel plan created by the first planning unit 14a.

The manual driving history (a history of a manual driving) is a history of the state of the vehicle M or of the driving operation performed by the driver during manual driving of the vehicle M performed by the driver after deactivation of the automatic driving control. For example, the manual driving history includes a history of tracks traveled by the vehicle M (a history of changes in the position of the vehicle M) or a history of the speed of the vehicle M. The manual driving history may further include a history of steering (the steering angle and the steering torque) of the steering wheel performed by the driver, a history of operation of the accelerator pedal or the brake pedal performed by the driver, or the like.

For example, the driving habit determination unit 41 compares a travel track of the vehicle M in the manual driving history and a travel track of the vehicle M in the first travel plan (a travel track of the vehicle M in a case where the automatic driving control has been executed based on the first travel plan). The driving habit determination unit 41 determines that the first travel plan is in accordance with the driving habit of the driver, when, in a zone of a certain distance, the maximum value of a difference in the lateral direction (lane width direction) between the travel track of the vehicle M in the manual driving history and the travel track of the vehicle M in the first travel plan is equal to or smaller than a distance threshold value. The driving habit determination unit 41 may determine that the first travel plan is in accordance with the driving habit of the driver, when a cumulative total value (or the sum of squares of a total value) of differences in the lateral direction between the travel track in the manual driving history and the travel track in the first travel plan measured at regular intervals in an extension direction of the lane is equal to or smaller than a cumulative threshold value. The distance threshold value and the cumulative threshold value are predetermined values.

The driving habit determination unit 41 may determine that the first travel plan is in accordance with the driving habit of the driver, when the maximum value of a difference between the vehicle speed history in the manual driving history and the vehicle speed history in the first travel plan remains equal to or smaller than a vehicle speed history threshold value for a certain time. The vehicle speed history threshold value is a predetermined value. The vehicle speed histories are compared with reference to time. Whether the first travel plan is in accordance with the driving habit of the driver in terms of the vehicle speed may also be determined based on a cumulative total value of differences measured at regular time intervals (or regular space intervals). The driving habit determination unit 41 may determine that the first travel plan is in accordance with the driving habit of the driver, only when both the travel track and the vehicle speed meet conditions. Specifically, the driving habit determination unit 41 may determine that the first travel plan is in accordance with the driving habit of the driver, when the maximum value of the difference in the lateral direction between the travel track in the manual driving history and the travel track in the first travel plan is equal to or smaller than the distance threshold value, and moreover the maximum value of the difference between the vehicle speed history in the manual driving history and the vehicle speed history in the first travel plan is equal to or smaller than the vehicle speed history threshold value.

In addition, the driving habit determination unit 41 may determine that the first travel plan is in accordance with the driving habit of the driver, when the maximum value of a difference between the steering angle history in the manual driving history and the steering angle history in the first travel plan is equal to or smaller than a steering history threshold value. The steering history threshold value is a predetermined value. It is possible to compare the operation histories of the accelerator pedal or the brake pedal in a similar manner by computing a history of the amount of pressing on the accelerator pedal or a history of the amount of pressing on the brake pedal from the vehicle speed history in the first travel plan.

The driving habit determination unit 41 may determine whether the first travel plan is in accordance with the driving habit of the driver by predicting a future course of the vehicle M manually driven by the driver from the manual driving history, and comparing the predicted course of manual driving and a course in the first travel plan. For example, when the maximum value of a difference in the lateral direction between the predicted course of manual driving and the course in the first travel plan is equal to or smaller than a course distance threshold value, the driving habit determination unit 41 determines that the first travel plan is in accordance with the driving habit of the driver. The course distance threshold value is a predetermined value. The driving habit determination unit 41 may determine that the first travel plan is in accordance with the driving habit of the driver, when a cumulative total value (or the sum of squares of a total value) of differences in the lateral direction between the course of manual driving and the course in the first travel plan measured at regular intervals in the extension direction of the lane is equal to or smaller than a cumulative threshold value.

The engagement control unit 42 resumes the automatic driving control based on the first travel plan when it is determined by the driving habit determination unit 41 that the first travel plan is in accordance with the driving habit of the driver after deactivation of the automatic driving control, even when the first reliability of the first travel plan is lower than the second reliability of the second travel plan. However, the automatic driving control is not resumed when the conditions required for starting the automatic driving control are not met due to sensor failure or the like.

Figure 8:
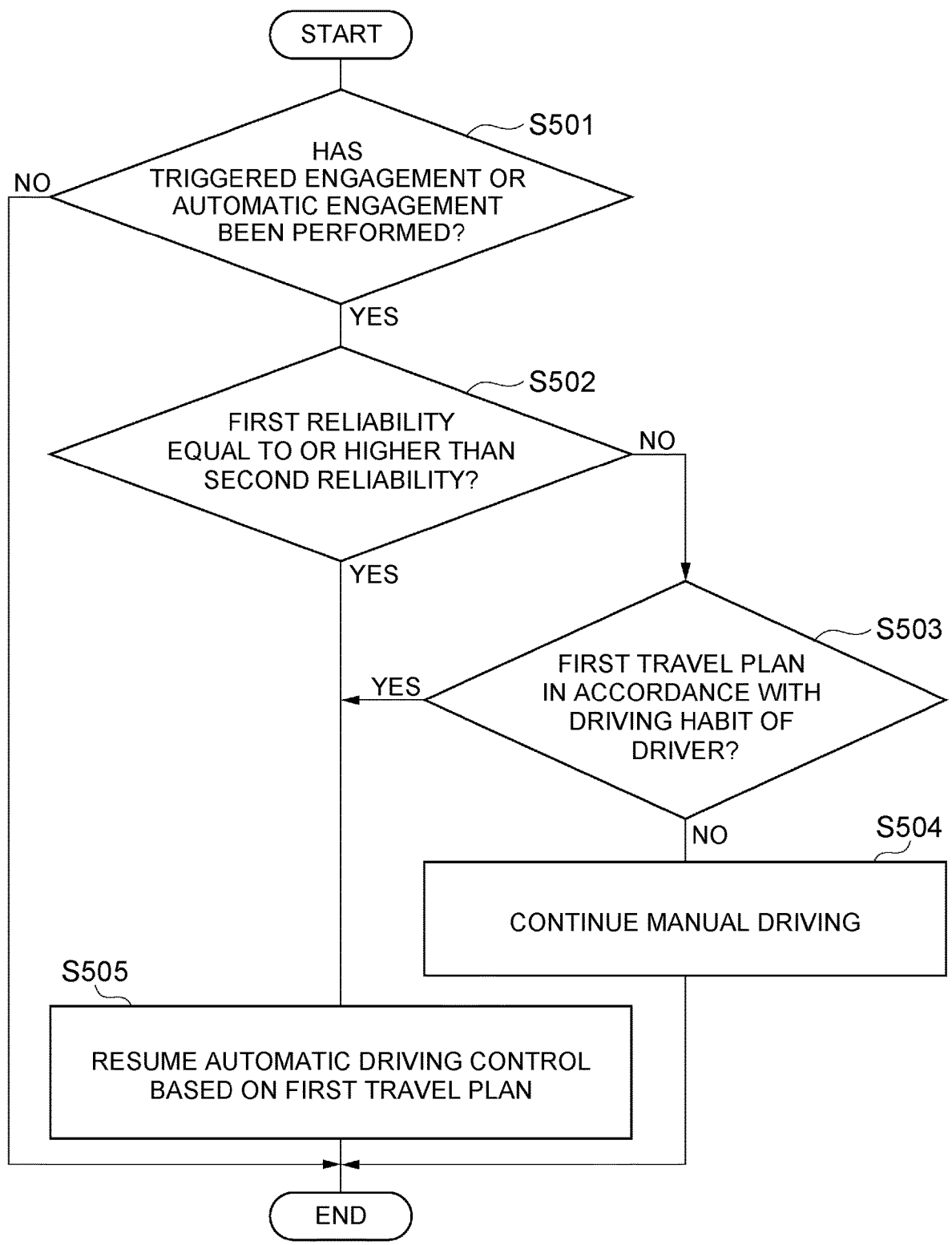
FIG. 8 is a flowchart showing a manual driving subroutine according to the third embodiment.

Next, a manual driving subroutine according to the third embodiment will be described using FIG. 8. FIG. 8 is a flowchart showing the manual driving subroutine according to the third embodiment. The process of the automatic driving control and the process of deactivating automatic driving are the same as those of the first embodiment, and therefore description thereof will be omitted.

As shown in FIG. 8, the engagement control unit 42 of the ECU 40 determines whether the triggered engagement or the automatic engagement has been performed (S501). When it is determined that neither the triggered engagement nor the automatic engagement has been performed (S501: NO), the ECU 40 ends the current process. Then, the ECU 40 repeats the process from step S501. When it is determined that the triggered engagement or the automatic engagement has been performed (S501: YES), the ECU 40 proceeds to step S502.

In step S502, the engagement control unit 42 determines whether the first reliability of the first travel plan is equal to or higher than the second reliability of the second travel plan. When it is determined that the first reliability of the first travel plan is equal to or higher than the second reliability of the second travel plan (S502: YES), the ECU 40 proceeds to step S505. When it is determined that the first reliability of the first travel plan is lower than the second reliability of the second travel plan (S502: NO), the ECU 40 proceeds to step S503.

In step S503, the driving habit determination unit 41 determines whether the first travel plan is in accordance with the driving habit of the driver based on the history of manual driving of the vehicle M performed by the driver and the first travel plan created by the first planning unit 14a. When it is determined that the first travel plan is in accordance with the driving habit of the driver (S503: YES), the ECU 40 proceeds to step S505. When it is determined that the first travel plan is not in accordance with the driving habit of the driver (S503: NO), the ECU 40 proceeds to step S504.

In step S504, the engagement control unit 42 continues manual driving without resuming the automatic driving control. In step S505, the engagement control unit 42 resumes the automatic driving control based on the first travel plan.

When it is determined by the driving habit determination unit 41 that the first travel plan is in accordance with the driving habit of the driver, the travel control unit 19 of the ECU 40 continues the automatic driving control based on the first travel plan without switching to the second travel plan, even when the status in which the first reliability of the first travel plan is lower than the second reliability of the second travel plan continues.

In a case where even once the first reliability of the first travel plan becomes equal to or higher than the second reliability of the second travel plan after it is determined by the driving habit determination unit 41 that the first travel plan is in accordance with the driving habit of the driver and the automatic driving control based on the first travel plan is resumed, the travel control unit 19 may switch from the automatic driving control based on the first travel plan to the automatic driving control based on the second travel plan when thereafter the first reliability of the first travel plan becomes lower than the second reliability of the second travel plan.

The automatic driving system 300 according to the third embodiment having been described above resumes the automatic driving control based on the first travel plan upon a request of the driver for starting the automatic driving control (the triggered engagement, the automatic engagement, or the like) when it is determined that the first travel plan is in accordance with the driving habit of the driver, even when the first reliability of the first travel plan is lower than the second reliability of the second travel plan after deactivation of the automatic driving control. It is highly likely that the driver feels comfortable with the first travel plan when the first travel plan is in accordance with the driving habit of the driver. In that case, therefore, even when the first reliability of the first travel plan is lower than the second reliability of the second travel plan, the automatic driving system 300 resumes the automatic driving control based on the first travel plan upon a request of the driver for starting the automatic driving control, and can thereby improve the user-friendliness.

While the preferred embodiments of the present disclosure have been described above, the present disclosure is not limited to the above embodiments. The present disclosure can be implemented in various forms other than the above embodiments, with various modifications and improvements made thereto based on the knowledge of those skilled in the art.

The functions of the automatic driving system 200 according to the second embodiment and those of the automatic driving system 300 according to the third embodiment may be combined in the automatic driving system 100 according to the first embodiment. Specifically, the automatic driving system 100 may resume the automatic driving control based on the first travel plan when the driver permits the resumption of the automatic driving control based on the first travel plan or when it is determined that the first travel plan is in accordance with the driving habit of the driver, even when the first reliability of the first travel plan is lower than the second reliability of the second travel plan after deactivation of the automatic driving control.

It is not absolutely necessary that the automatic driving systems 100 to 300 include the driver reliability calculation unit 16 and the reliability correction unit 17. In other words, it is not absolutely necessary to correct the first reliability. In this case, the HMI 8 need not include the state detection unit 8a.

The automatic driving system 200 according to the second embodiment need not always seek the permission of the driver to resume the automatic driving control based on the first travel plan after deactivation of the automatic driving control. The automatic driving system 200 may instead seek the permission of the driver for resumption, only when the automatic driving control is deactivated after the first reliability of the first travel plan becomes lower than the second reliability of the second travel plan while the automatic driving control is executed and so the automatic driving control based on the first travel plan switches to the automatic driving control based on the second travel plan.

Specifically, in a case where the first reliability of the first travel plan is lower than the second reliability of the second travel plan after deactivation of the automatic driving control based on the second travel plan, the automatic driving system 200 resumes the automatic driving control based on the first travel plan when the driver permits the resumption of the automatic driving control based on the first travel plan. In other words, even when the driver permits the resumption of the automatic driving control based on the first travel plan, the automatic driving system 200 does not resume the automatic driving control when the automatic driving control based on the first travel plan is directly deactivated without switching to the second travel plan, and the first reliability of the first travel plan is lower than the second reliability of the second travel plan. Thus, the automatic driving system 200 can avoid a situation where the driver, unaware of a decrease in the first reliability of the first travel plan, performs an operation of permitting the resumption of the automatic driving control based on the first travel plan (especially the operation of simply pressing the automatic driving control start button), and thereby unintendedly allows the resumption of the automatic driving control based on the first travel plan of which the first reliability has decreased.

What is claimed is:

1. An automatic driving system comprising
an electronic control unit configured:
   to recognize a position of a vehicle based on a measurement result of a position measurement unit of the vehicle;
   to recognize an environment surrounding the vehicle based on a detection result of an external sensor configured to detect conditions outside the vehicle;
   to recognize a state of the vehicle based on a detection result of an internal sensor configured to detect the state of the vehicle;
   to create a first travel plan of the vehicle based on the position of the vehicle, the environment surrounding the vehicle, and the state of the vehicle;
   to calculate a first reliability of the first travel plan based on at least one of a reliability of the position of the vehicle, a reliability of a recognition of the environment surrounding the vehicle, a reliability of a recognition of the state of the vehicle, and the first travel plan;
   to create a second travel plan of the vehicle based on one or two of the position of the vehicle, the environment surrounding the vehicle, and the state of the vehicle;
   to calculate a second reliability of the second travel plan, based at least either on a recognition result used to create the second travel plan or on the second travel plan, the recognition result being selected from any one of the reliability of the position of the vehicle, the environment surrounding the vehicle, and the state of the vehicle;
   to execute automatic driving control of the vehicle such that the vehicle travels based on the first travel plan;
   to execute the automatic driving control such that the vehicle travels based on the second travel plan while the first reliability of the first travel plan is lower than the second reliability of the second travel plan;
   to start, while the vehicle is not traveling by the automatic driving control, the automatic driving control such that the vehicle travels based on the first travel plan when the first reliability of the first travel plan is equal to or higher than the second reliability of the second travel plan; and
   not to start, while the vehicle is not traveling by the automatic driving control, the automatic driving control when the first reliability of the first travel plan is lower than the second reliability of the second travel plan.

2. The automatic driving system according to claim 1, wherein
the electronic control unit is configured
   to deactivate the automatic driving control when a predetermined automatic driving deactivation condition is met,
   to resume, in a case where the automatic driving control is deactivated, the automatic driving control such that the vehicle travels based on the first travel plan, when the first reliability of the first travel plan is equal to or higher than the second reliability of the second travel plan, and
   not to resume, in a case where the automatic driving control is deactivated, the automatic driving control when the first reliability of the first travel plan is lower than the second reliability of the second travel plan.

3. The automatic driving system according to claim 2, wherein
the electronic control unit is configured to resume the automatic driving control based on the first travel plan when a driver of the vehicle permits resumption of the automatic driving control based on the first travel plan, in a case where the automatic driving control is deactivated and the first reliability of the first travel plan is lower than the second reliability of the second travel plan.

4. The automatic driving system according to claim 2, wherein
the electronic control unit is configured to
   determine, when the automatic driving control is deactivated, whether the first travel plan is in accordance with a driving habit of a driver of the vehicle, based on a history of manual driving of the vehicle performed by the driver and on the first travel plan, and
   resume, even when the first reliability of the first travel plan is lower than the second reliability of the second travel plan, the automatic driving control based on the first travel plan by a request of the driver for starting the automatic driving control, when it is determined that the first travel plan is in accordance with the driving habit of the driver.

5. The automatic driving system according to claim 1, wherein
the electronic control unit is configured to create the second travel plan based on the state of the vehicle.

6. The automatic driving system according to claim 4, wherein
the electronic control unit is configured to determine whether the first travel plan is in accordance with the driving habit of the driver by comparing the first travel plan with at least one of a travel track of the vehicle, a speed of the vehicle, and a steering angle of the vehicle included in the history of the manual driving, and a future course of the vehicle predicted from the history of the manual driving.

* * * * *